United States Patent
Fukuda

(10) Patent No.: US 9,081,085 B2
(45) Date of Patent: Jul. 14, 2015

(54) SPREAD SPECTRUM RADAR APPARATUS AND METHOD OF CONTROLLING THE SAME

(71) Applicant: Panasonic Corporation, Osaka (JP)

(72) Inventor: Takeshi Fukuda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 13/954,085

(22) Filed: Jul. 30, 2013

(65) Prior Publication Data

US 2013/0314268 A1     Nov. 28, 2013

Related U.S. Application Data

(63) Continuation of application No. PCT/JP2012/007090, filed on Nov. 6, 2012.

(30) Foreign Application Priority Data

Nov. 9, 2011   (JP) ................................ 2011-245133

(51) Int. Cl.
  *G01S 13/42*       (2006.01)
  *G01S 7/493*       (2006.01)
  (Continued)

(52) U.S. Cl.
  CPC ........... *G01S 13/0209* (2013.01); *G01S 13/325* (2013.01); *G01S 13/584* (2013.01); *G01S 2007/358* (2013.01)

(58) Field of Classification Search
  CPC ............. G01S 7/02; G01S 7/35; G01S 7/352;
    G01S 2007/358; G01S 13/02; G01S 13/0209;
      G01S 13/06; G01S 13/08; G01S 13/32;
      G01S 13/325; G01S 13/36; G01S 13/38;
      G01S 13/40; G01S 13/50; G01S 13/58;
      G01S 13/583; G01S 13/584; G01S 7/023;
      G01S 7/40; G01S 7/4004; G01S 7/4021;
    G01S 13/88; G01S 13/93; H04B 1/69; H04B
      1/707; H04B 2001/70706

USPC ............. 342/21, 27–28, 70–72, 89–115, 118,
          342/128–133, 145–147, 159–164, 175,
        342/192–197; 375/130, 140–153; 714/699,
                                              714/724
  See application file for complete search history.

(56) References Cited

U.S. PATENT DOCUMENTS 7,138,939 B2 * 11/2006 Honda ........................... 342/129
7,148,841 B2   12/2006 Yoneda et al.
(Continued)

FOREIGN PATENT DOCUMENTS

| JP | 64-18083 | 1/1989 |
| JP | 2-47588  | 3/1990 |

(Continued)

OTHER PUBLICATIONS

International Search Report issued Dec. 11, 2012 in corresponding International Application No. PCT/JP2012/007090.

*Primary Examiner* — Bernarr Gregory
(74) *Attorney, Agent, or Firm* — Wenderoth, Lind & Ponack, L.L.P.

(57) ABSTRACT

A radar apparatus includes: a transmission circuit; a reception circuit; a Doppler filter that discriminates baseband signals per distance and per Doppler frequency corresponding to the speed of an object; a threshold processing unit group that removes unwanted signals from output signals of the Doppler filter; and an estimation unit that estimates a position and speed of the object from the output signals removed of the unwanted signals. The threshold processing unit group includes threshold processing units corresponding to respective discriminated Doppler frequencies. Each threshold processing unit calculates a threshold value for a corresponding Doppler frequency using a peak value of the output signals in a range of distance corresponding to an object detection area, and determines output signals in the range that are no greater than the threshold value to be the unwanted signals.

8 Claims, 12 Drawing Sheets

(51) Int. Cl.
  *G01S 13/02*   (2006.01)
  *G01S 13/32*   (2006.01)
  *G01S 13/58*   (2006.01)
  *G01S 13/00*   (2006.01)
  *G01S 7/00*    (2006.01)
  *G01S 7/35*    (2006.01)

(56) References Cited

U.S. PATENT DOCUMENTS

| | | | |
|---|---|---|---|
| 7,165,200 B2 * | 1/2007 | Jani et al. | 714/724 |
| 7,199,751 B2 * | 4/2007 | Mikami et al. | 342/109 |
| 7,406,115 B2 * | 7/2008 | Nakano et al. | 375/150 |
| 7,460,055 B2 * | 12/2008 | Nishijima et al. | 342/70 |
| 7,529,290 B2 * | 5/2009 | Hiromori | 375/148 |
| 7,642,952 B2 * | 1/2010 | Fukuda | 342/175 |
| 7,714,777 B2 * | 5/2010 | Fukuda | 342/175 |
| 7,724,802 B2 * | 5/2010 | Honda et al. | 375/130 |
| 7,812,761 B2 * | 10/2010 | Shirakawa | 342/195 |
| 7,855,677 B2 * | 12/2010 | Negoro et al. | 342/195 |
| 2006/0055588 A1 | 3/2006 | Yoneda et al. | |
| 2009/0003412 A1 * | 1/2009 | Negoro et al. | 375/130 |
| 2009/0015464 A1 | 1/2009 | Fukuda | |

FOREIGN PATENT DOCUMENTS

| | | |
|---|---|---|
| JP | 3-248077 | 11/1991 |
| JP | 5-264725 | 10/1993 |
| JP | 2000-9833 | 1/2000 |
| JP | 2005-265461 | 9/2005 |
| JP | 2011-80961 | 4/2011 |
| WO | 2006/106774 | 10/2006 |

* cited by examiner

SPREAD SPECTRUM RADAR APPARATUS AND METHOD OF CONTROLLING THE SAME

CROSS REFERENCE TO RELATED APPLICATIONS

This is a continuation application of PCT International Application No. PCT/JP2012/007090 filed on Nov. 6, 2012, designating the United States of America, which is based on and claims priority of Japanese Patent Application No. 2011-245133 filed on Nov. 9, 2011. The entire disclosures of the above-identified applications, including the specifications, drawings and claims are incorporated herein by reference in their entirety.

FIELD

One or more exemplary embodiments disclosed herein relate generally to spread spectrum radar apparatuses, and control methods thereof, that detect an object by use of a spectrum-spread detection radio wave.

BACKGROUND

Technological development of radar apparatuses integrated into automobiles (hereinafter referred to as automobile radar apparatuses) has been dramatic in recent years. Proposed examples include radar apparatuses which use spread spectrum techniques (hereinafter referred to as spread spectrum radar apparatuses) (for example, see Patent Literature PTL 1 and PTL 2).

CITATION LIST

Patent Literature

[PTL 1] WO 2006/106774
[PTL 2] Japanese Unexamined Patent Application Publication No. 2000-9833

SUMMARY

Technical Problem

However, the above configurations are problematic in that a low signal strength reflected wave cannot be detected when a high signal strength reflected wave is present.

Solution to Problem

In one general aspect, the techniques disclosed here feature a spread spectrum radar apparatus that detects an object by use of a detection radio wave that is spectrum-spread, the spread spectrum radar apparatus including: a transmission circuit that generates a spread spectrum signal and radiates the spread spectrum signal as the detection radio wave, the spread spectrum signal being spectrum-spread by combining an oscillating signal and a first pseudo noise code; a reception circuit that receives the detection radio wave reflected back from the object as a reception signal, extracts, based on (i) a second pseudo noise code obtained by time-delaying the first pseudo noise code and (ii) the oscillating signal, a signal of a specific frequency band from a despread output of the reception signal, and generates baseband signals by separating the extracted signal by distance, each of the distances corresponding to an amount of time delay between the first pseudo noise code and the second pseudo noise code; a Doppler filter that, for each of the distances, discriminates a time series of the baseband signals based on Doppler frequencies to output output signals, each of which indicates a strength and is associated with one of the distances and one of the Doppler frequencies, the Doppler frequencies each being a difference between a frequency of the detection radio wave radiated from the transmission circuit and a frequency of the detection radio wave received by the reception circuit; a removal unit that includes a plurality of threshold processing units provided corresponding to the Doppler frequencies resulting from the discrimination and is configured to remove an unwanted signal from the output signals output by the Doppler filter; and an estimation unit configured to estimate a position and a speed of the object from the output signals removed of the unwanted signal, wherein each of the threshold processing units is configured to calculate a threshold value for a corresponding one of the Doppler frequencies using a peak value which is a maximum value of the output signals in a range of distance corresponding to a detection area for the object, and determine the output signals in the range of distance that are no greater than the calculated threshold value to be the unwanted signal.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The spread spectrum radar apparatus according to one or more exemplary embodiments or features disclosed herein is capable of detecting a low signal strength reflected wave even when a high signal strength reflected wave is present.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (Underlying Knowledge Forming Basis of the Present Disclosure)

In relation to the automobile radar apparatus disclosed in the Background section, the inventors have found the following points to be problematic at the present time:

Automobile radar apparatuses are used to detect automobiles in front of and obstacles behind the user automobile with the aim of improving driving safety and making driving more convenient such as with reverse driving support. When used for such purposes, it is necessary to suppress the influence of unwanted radio waves, such as interference from electromagnetic waves originating from other radar apparatuses of the same type.

In contrast, since radio waves to be transmitted are modulated in spread spectrum radar apparatuses using a PN code for spreading, radio waves modulated using a different code are suppressed within the receiver of a radar apparatus using a different scheme with no code modulation.

Moreover, since the radio waves to be transmitted are frequency-spread using a PN code, it is possible to minimize the electric power per unit frequency and thus to reduce the influence on other wireless systems. It is also possible to freely set a relationship between distance resolution and maximum detectable range by adjusting the chip rate and code period of the PN code.

Moreover, since continuous transmission of electromagnetic waves is possible, peak power will not increase. However, even if despreading is performed, unwanted radio waves mixed in during radio wave propagation are spread across a wide band in a frequency region and unwanted noise or interference signals are suppressed using a narrow band wave filter.

Figure 11:
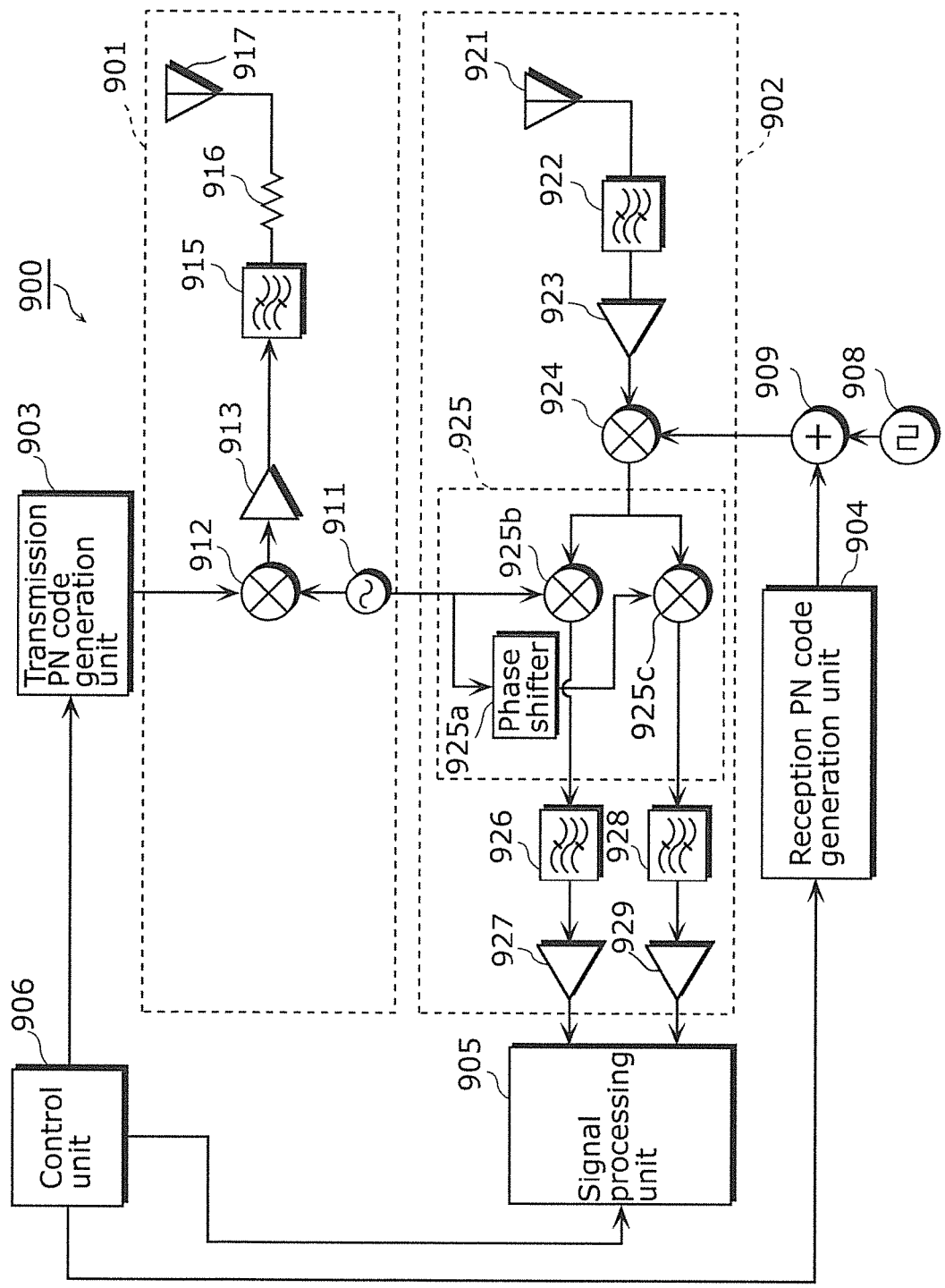
FIG. 11 is a block diagram showing the configuration of a conventional spread spectrum radar apparatus.

FIG. 11 is a diagram showing a general structure of a conventional spread spectrum radar apparatus.

As shown in FIG. 11, the radar apparatus 900 includes a transmission PN code generation unit 903, a transmission unit 901, a reception unit 902, a reception PN code generation unit 904, a repetition code generator 908, an eXclusive OR (XOR) operator 909, a signal processing unit 905, and a control unit 906. The transmission unit 901 includes a local oscillator 911, a balanced modulator 912, an amplifier 913, a band pass filter 915, an attenuator 916, and a transmission antenna 917. The reception unit 902 includes a reception antenna 921, a band pass filter 922, a low noise amplifier 923, a balanced modulator 924, a quadrature demodulator 925, band pass filters 926 and 928, and amplifiers 927 and 929. The quadrature demodulator 925 includes a phase shifter 925a and balanced modulators 925b and 925c.

The radar apparatus 900 causes the transmission unit to generate a modulation signal from an output of the local oscillator 911 and a transmission code generated by the transmission PN code generation unit 903. The output of the local oscillator 911 is a narrow band signal, but the modulation signal is frequency-spread across a wide band since a code having a high bit rate is used as the transmission PN code.

This modulation signal passes through amplifier 913, the band pass filter 915, and the attenuator 916, and is radiated into the air as a detection radio wave from the transmission antenna 917.

The reception signal of the detection radio wave reflected back from an object is received by the reception antenna 921 in the reception unit 902. After the reception signal is filtered of unwanted waves outside the band by the band pass filter 922, the reception signal is input into the balanced modulator 924 through the low noise amplifier 923.

A reception correlation code obtained by delaying an output of the transmission PN code generation unit 903 is generated by the reception PN code generation unit 904, and an XOR of the repetition code generator 908 is output from the XOR operator 909 as the despreading code.

The reception signal is despread by the balanced modulator 924 using the despreading code and frequency transformed by the quadrature demodulator 925 to generate two types of baseband signals, I and Q.

The phase of the transmission PN code included as the modulation signal in the reception signal is time-delayed from the transmission output according to the distance from an object, but when an amount of time-delay between the reception correlation code and the transmission PN code and an amount of delay of the phase of the transmission PN code included in the reception signal match, in other words, when there is correlation between the reception signal and the reception correlation code (correlation), a signal having the same output waveform as the repetition code generator 908 is generated as the baseband signal, and when the time-delay does not match, in other words, when there is no correlation (noncorrelation), a signal that is frequency-spread over a wide band is generated.

When the repetition code generator 908 and the XOR operator 909 are not provided, in other words, when the reception correlation code is directly input into the balanced modulator 924, the baseband signal output frequency in the case of correlation only becomes a direct current component whereby the radar apparatus is subject to influence from circuit direct current offset. As such, the repetition code generator 908 and the XOR operator 909 are provided to prevent this disadvantage.

The band pass filters 926 and 928 are designed to selectively pass the fundamental waves or harmonic waves of the repetition code generator 908 whereby the reception signal having a propagation delay time equal to the delay time between the reception correlation code and the transmission PN code is selectively transmitted to the signal processing unit 905. By the control unit 906 successively sweeping τ when the relationship τ=2R/c where c is light speed, R is the distance from the radar apparatus 900 to an object, and τ is the time-delay set between the reception correlation code and the transmission PN code, the signal processing unit 905 can obtain the strength and phase of the reflection signal relative to the distance R. The signal processing unit 905 further estimates the distance of an object based on the signal strength for each distance, and estimates a relative traveling speed of an object by measuring the temporal change in phase for each distance.

Here, even when there are signals as input signals other than the detection radio wave radiated by the radar apparatus 900 that are unwanted, except in the case when there is correlation with the transmission PN code, the signals are baseband signals that are spread over a wide band, and as such, are suppressed by the band pass filters 926 and 928. This is one superior feature of the spread spectrum radar apparatus.

However, with a spread spectrum radar apparatus having a conventional configuration, when a reflection signal having a high signal strength is received, even in the case that the amount of time-delay between the reception correlation code and the transmission code and the amount of delay of the phase of the transmission code included in the reception signal do not match in accordance with the self-correlation characteristic of the transmission code, a constant leakage signal is output, making it impossible to detect a signal having a low signal strength. In order to detect a signal having a low signal strength, a signal strength threshold value is set, and if a signal strength that is greater than or equal to the threshold value for a given time-delay setting is output and it is assessed that an object is present at the corresponding distance even though there actually is not, a problem arises that a false positive detection is made as if there actually were an object present. The ratio of the signal strength of the leakage signal to the signal strength when the amount of delay of the phase match is called the out-of-range rejection ratio (hereinafter referred to as ORR). It should be noted that the out-of-range rejection ratio is also referred to as the out-of-range signal suppression ratio.

This problem occurs due to the input signal strength being remarkably widely distributed due to the size, material, and distance of the target object, and due to the self-correlation characteristic of the transmission code having a limited ORR. PTL 2 discloses an automotive collision prevention radar apparatus that is configured to properly adjust signal strength. With PTL 2, a sufficient detection rate for target tracking is achieved since transmission power control and reception amplification level control are performed for each detection target.

Moreover, with the configuration of PTL 2, since the signal strength is merely adjusted for each target, the problem specific to spread frequency radars that when a high signal strength reflected wave is received, a signal having an strength that is the quotient of the signal strength of the reflected wave and the ORR leaks to all other ranges is not solved, and thus it is still not possible to detect a reflection signal having a signal strength lower than a signal strength determined according to the signal strength of the reflected wave and the ORR when a high signal strength reflected wave is received. This creates a concern that a person cannot be detected when, for example, a large automobile is present behind the person. This is because relative to a person with a high percentage of water which has a significantly weak reflection strength, an automobile made mostly of metal and intricately shaped which produces multiple reflections has a significantly large backscatter cross-section relative to the radar signal and thus it is possible that the strength of the leakage signal arising from ORR caused by strong waves reflected from the large automobile will be weaker than the signal strength of the waves reflected from the person in front of the automobile.

According to an exemplary embodiment disclosed herein, a spread spectrum radar apparatus detects an object by use of a detection radio wave that is spectrum-spread and includes: a transmission circuit that generates a spread spectrum signal and radiates the spread spectrum signal as the detection radio wave, the spread spectrum signal being spectrum-spread by combining an oscillating signal and a first pseudo noise code; a reception circuit that receives the detection radio wave reflected back from the object as a reception signal, extracts, based on (i) a second pseudo noise code obtained by time-delaying the first pseudo noise code and (ii) the oscillating signal, a signal of a specific frequency band from a despread output of the reception signal, and generates baseband signals by separating the extracted signal by distance, each of the distances corresponding to an amount of time delay between the first pseudo noise code and the second pseudo noise code; a Doppler filter that, for each of the distances, discriminates a time series of the baseband signals based on Doppler frequencies to output output signals, each of which indicates a strength and is associated with one of the distances and one of the Doppler frequencies, the Doppler frequencies each being a difference between a frequency of the detection radio wave radiated from the transmission circuit and a frequency of the detection radio wave received by the reception circuit; a removal unit that includes a plurality of threshold processing units provided corresponding to the Doppler frequencies resulting from the discrimination and is configured to remove an unwanted signal from the output signals output by the Doppler filter; and an estimation unit configured to estimate a position and a speed of the object from the output signals removed of the unwanted signal, wherein each of the threshold processing units is configured to calculate a threshold value for a corresponding one of the Doppler frequencies using a peak value which is a maximum value of the output signals in a range of distance corresponding to a detection area for the object, and determine the output signals in the range of distance that are no greater than the calculated threshold value to be the unwanted signal.

With this, it is possible to detect a detection radio wave having a low signal strength even when a detection radio wave reflected off one object and having a low signal strength and a detection radio wave reflected off a different object and having a high signal strength are present. In other words, it is possible to detect the one object. Specifically, since it is possible to independently set a threshold value for each Doppler frequency, it is possible to detect a small signal even when a large signal and a small signal are present if their respective Doppler frequencies are different.

For example, the threshold value may be a greater one of a first threshold value and a second threshold value, the first threshold value being determined from the peak value and the second threshold value being determined from a noise floor of the output signals output by the Doppler filter when the detection radio wave is not reflected back from the object.

With this, it is possible to prevent false positive detection from occurring due to a noise floor defined by system thermal noise and the like, and optimally maintain the false positive detection rate and true positive detection rate.

For example, the first threshold value may be a product of an out-of-range leakage signal strength and a first allowance factor that is no less than one, the out-of-range leakage signal strength being a quotient of a signal strength of the peak value and an out-of-range signal suppression ratio being determined by a self-correlation characteristic of the first pseudo noise code, the second threshold value may be a product of a signal strength of the noise floor and a second allowance factor that is no less than one, and the second allowance factor may be greater than the first allowance factor.

With this, even if it is an object that returns a detection radio wave weaker than the out-of-range leakage signal strength determined by the out-of-range signal suppression ratio, it is possible to perform signal detection by separating the detection radio wave at each Doppler frequency and distinguishing them from the out-of-range leakage signal. As a result, it is possible to avoid false positive detection while improving the true positive detection ratio.

Moreover, since the out-of-range signal suppression ratio is determined by the self-correlation characteristic of the first pseudo noise code, the out-of-range leakage signal strength is nearly uniquely calculated. As such, even if the value of the first allowance factor is low, there is little concern that false positive detection due to detection of the out-of-range leakage signal will occur. In contrast, since the noise floor is defined by system thermal noise, the level wavers greatly. Consequently, false positive detection due to the detection of noise can be avoided by increasing the value of the second allowance factor.

For example, the estimation unit may be configured to estimate a distance from the object using distance data indicating a distribution of strength with respect to the distances in each of the Doppler frequencies, from among the output signals removed of the unwanted signal, estimate a speed of the object using Doppler frequency data indicating a distribution of strength with respect to the Doppler frequencies in each of the distances, from among the output signals removed of the unwanted signal and in a given range of distance from the estimated distance, and track the object using a time series of the estimated distances and speeds.

With this, it is possible to accurately track an object. Specifically, since it is possible to estimate distance and speed using distance data and Doppler frequency data corresponding to a detection radio wave having a low signal strength detected by independently setting a threshold value for each Doppler frequency, tracking can be performed more accurately than when discrimination is not performed with respect to each Doppler frequency.

For example, the removal unit may further include a speed incomplete flag provided for each of the distances for indicating that the Doppler frequency data in a corresponding one of the distances is incomplete among the output signals, and when a signal lower in strength than the first threshold value and higher in strength than the second threshold value is present among the output signals, may turn on the speed incomplete flag corresponding to the distance to which the signal belongs.

With this, when a portion of the Doppler frequency data of the detection radio wave returning from an object, which indicates the distribution of signal strength relative to Doppler frequency, is masked by a distance that differs from the object and the out-of-range leakage signal of a large signal having a Doppler frequency that is included in the Doppler frequency data for the object, it is possible to designate a traveling speed in a processing unit at the later stage of the removal unit without using Doppler frequency data corresponding to the object, for example. As a result, it is possible to optimize the later stage processing of the removal unit and reduce the deviation between the actual traveling speed and the estimated speed of the object by using the Doppler frequency data corresponding to the object.

For example, when at least one of the speed incomplete flags corresponding to the given range of distance is turned on, the estimation unit may be configured to omit the Doppler frequency data for the distances to which the speed incomplete flags correspond and estimate the distance of the object.

With this, it is possible to reduce the deviation between the actual traveling speed and the estimated speed of the object by estimating the distance of the object using incomplete Doppler frequency data which is the original Doppler frequency data that is partially masked.

For example, for the distances flagged with the speed incomplete flag, the estimation unit may be configured to estimate the speed of the object from a time series of the estimated distance of the object.

With this, it is possible to estimate speed at distances flagged with a speed incomplete flag without using incomplete Doppler frequency data.

It should be noted that one or more exemplary embodiments disclosed herein can be realized not only as a spread spectrum radar apparatus including these kinds of processing units, but also as a method of controlling a spread spectrum radar apparatus which employs the processes performed by the characteristic processing units included in the spread spectrum radar apparatus as steps.

Hereinafter, certain exemplary embodiments are described in greater detail with reference to the accompanying Drawings.

Each of the exemplary embodiments described below shows a general or specific example. The numerical values, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

First, an outline of the configuration and an operation of the radar apparatus according to Embodiment 1 will be described.

Figure 1:
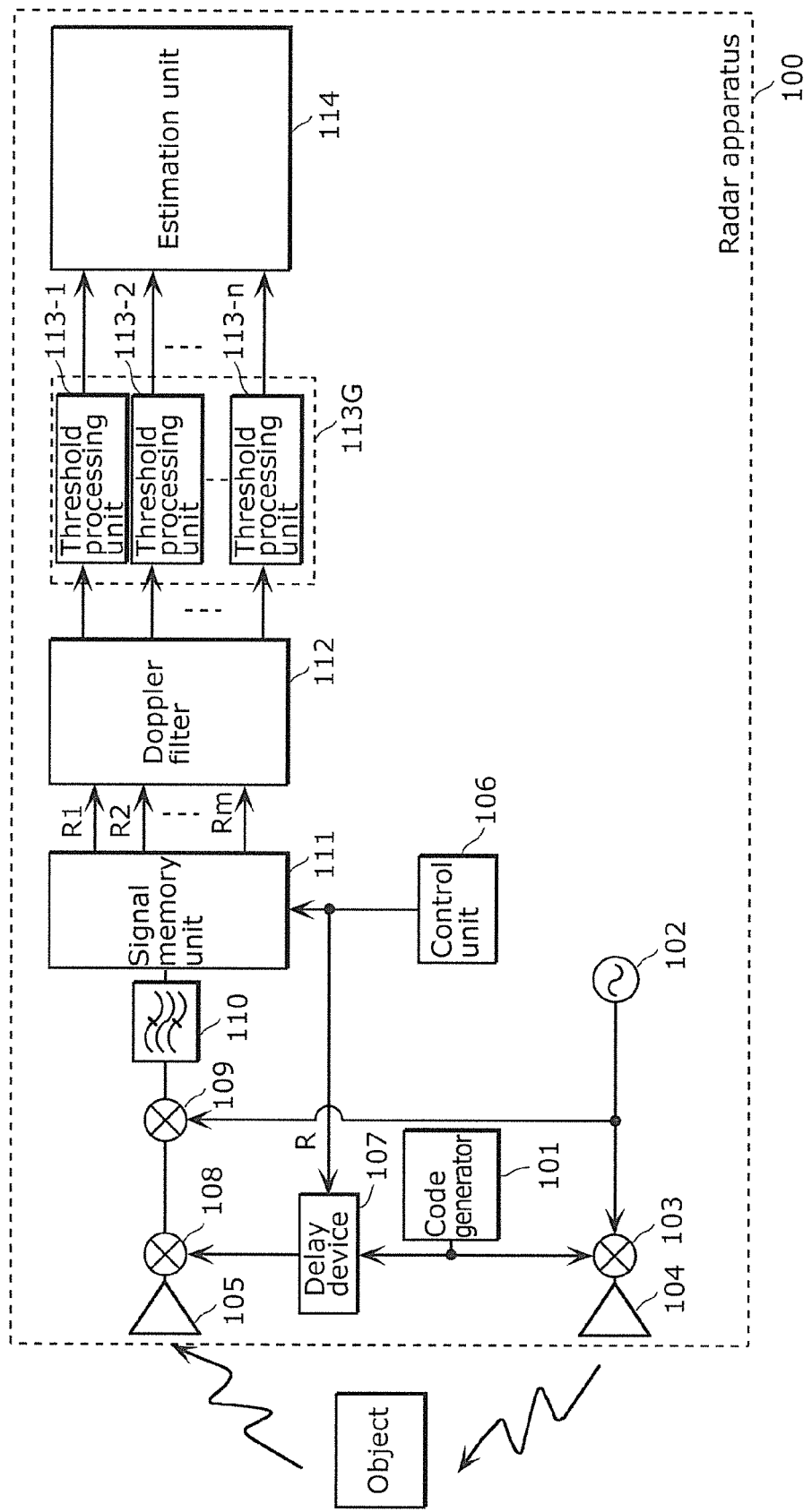
FIG. 1 is a block diagram showing the configuration of the radar apparatus according to Embodiment 1.

FIG. 1 is a block diagram showing the configuration of the radar apparatus 100 according to Embodiment 1.

The radar apparatus 100, which is an example of a spread spectrum radar apparatus, includes a code generator 101, a signal source 102, a modulator 103, a transmission antenna 104, a reception antenna 105, a control unit 106, a delay device 107, a despreader 108, a demodulator 109, a filter 110, a signal memory unit 111, a Doppler filter 112, a threshold processing unit group 113G, and an estimation unit 114. The threshold processing unit group 113G is equivalent to the removal unit, and includes threshold processing units 113-1 through 113-$n$. It should be noted that hereinafter, the threshold processing units 113-1 through 113-$n$ are not distinguished from each other in particular, and in some instances are simply referred to as the threshold processing unit 113.

A narrow-band carrier wave generated by the signal source 102 is modulated by the modulator 103 using a spread spectrum code generated by the code generator 101 thus becoming a spread wave whose frequency band is spread over a wide band. This spread wave is radiated from the transmission antenna 104 as a detection radio wave. The returning detection radio wave is received by the reception antenna 105 after reflecting off an object and despread in the despreader 108 using a code that is the spread spectrum code generated by the code generator 101 that has been delayed by the delay device 107 by a round-trip propagation time of the detection radio wave and that corresponds to the distance R designated by the control unit 106.

The despread signal is transformed into baseband signals by the demodulator 109 using the carrier wave generated by the signal source 102. A specific frequency band of the baseband signals are selected by the filter 110, associated with the distance R by the control unit 106, and stored in the signal memory unit 111. Since the control unit 106 sweeps the distance R at a constant interval, a time series baseband signal R1, R2 . . . Rm for each distance (hereinafter, each distance segment is referred to as a range bin) is stored in the signal memory unit 111. For each range bin, this stored time series data for the baseband signal is separated by the Doppler filter into individual signals for each Doppler frequency component (hereinafter, each Doppler frequency component segment is referred to as a Doppler bin), and output as a signal $S_{Ridj}$ that has been segmented according to both the range bin and the Doppler bin.

Next, data extraction is performed for each Doppler bin by the threshold processing unit 113, and unwanted signals are removed before the result is output. Moreover, the position and speed of the object is estimated by the estimation unit 114.

Next, an operation of the radar apparatus 100 according to Embodiment 1 as described above will be described while further describing the configuration thereof in detail.

Figure 2:
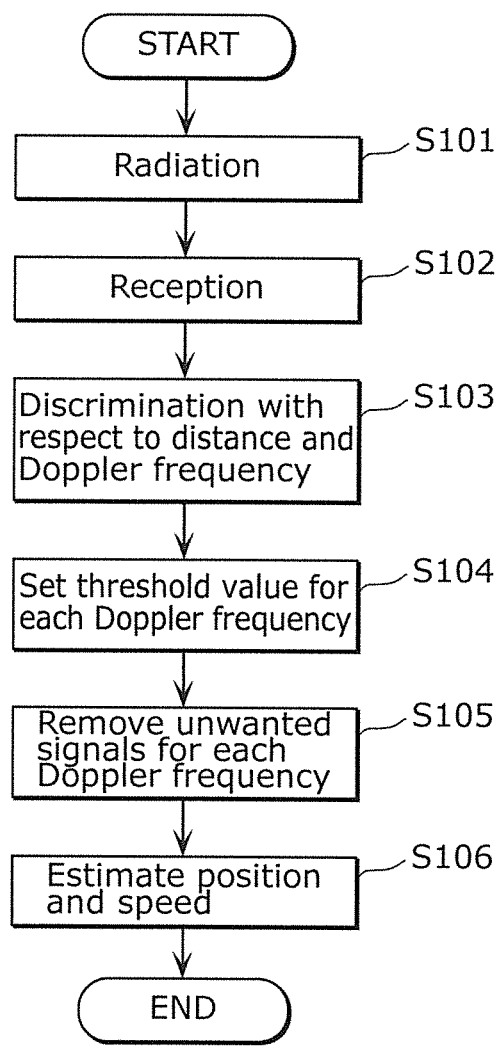
FIG. 2 is a flow chart showing an operation of the radar apparatus.

FIG. 2 is a flow chart showing an operation of the radar apparatus 100.

First, the radar apparatus 100 radiates a detection radio wave from the transmission antenna 104 (S101). Specifically, the radar apparatus 100 generates a spread spectrum signal by combining and spectrum spreading the carrier wave generated by the signal source 102 and the spread spectrum code generated by the code generator 101, and radiates the spread spectrum signal as a detection radio wave.

Even more specifically, the code generator 101 generates a spread spectrum code used for spectrum spreading that is an M-sequence code having a code length of 511 and a code rate of 1.5 Gbps. The signal source 102 generates, for example, a carrier wave in the frequency band of 60 GHz. The modulator 103 is, for example, a mixer which generates a spread spectrum signal that is the carrier wave that has been spread over a wide band, by spreading the signal source 102 using a transmission spread spectrum code. The transmission antenna 104 then radiates the spread spectrum signal generated by the modulator 103 as a detection radio wave.

It should be noted that the carrier wave generated by the signal source 102 and the spread spectrum code generated by the code generator 101 are equivalent to the oscillating signal and the first pseudo noise code, and the signal source 102, the modulator 103, and the transmission antenna 104 are equivalent to the transmission circuit.

Next, the radar apparatus 100 receives, via the reception antenna 105, the detection radio wave reflected back from an object (S102). Specifically, the radar apparatus 100 receives the detection radio wave reflected back from an object as a reception signal, and based on (i) a spread spectrum code obtained by time-delaying the spread spectrum code generated by the code generator 101 and (ii) the carrier wave, extracts a signal of a specific frequency band from an output of the reception signal that has been despread. The extracted result is separated at distances which correspond to an amount of time delay between the spread spectrum code generated by the code generator 101 and the spread spectrum code time-delayed by the delay device 107 to generate baseband signals.

Even more specifically, the reception antenna 105 outputs the detection radio wave reflected back from the object to the despreader 108 as the reception signal. The despreader 108 is, for example, a mixer which uses the spread spectrum code delayed by the delay device 107 to despread the reception signal output from the reception antenna 105, and outputs the result to the demodulator 109. Hereinafter, the spread spectrum code generated by the code generator 101 is also referred to as the transmission spread spectrum code, and the spread spectrum code delayed by the delay device 107 is also referred to as the reception spread spectrum code.

Here, the amount of time-delay with regard to the delay device 107 is a time which corresponds to the distance R designated by the control unit 106. As such, when the delay time of the detection radio wave received by the reception antenna 105 with respect to the detection radio wave radiated by the transmission antenna 104 matches the amount of time the spread spectrum code is delayed by the delay device 107, a narrow-band signal is output from the despreader 108. That is to say, when the delay time of the reception spread spectrum code matches the round-trip propagation time with respect to the radar apparatus 100 and an object, a narrow-band signal is output from the despreader 108.

Using the carrier wave, the demodulator 109, which is, for example, a mixer, demodulates the reception signal despread by the despreader 108 to generate a baseband signal. The filter 110 selectively passes the fundamental and harmonic waves of the spread spectrum code that are included in the baseband signal, thus removing unwanted signal components included in the baseband signal. The baseband signal removed of unwanted signal components is associated with a sweep count and a number indicating a range bin, and then stored in the signal memory unit 111.

The radar apparatus 100 repeats the above-described radiating process (S101) and reception process (S102) while delaying time using the delay device 107 in order to completely cover the detection area of an object. In other words, the control unit 106 sweeps the delay time so that, for example, the reception spread spectrum code is shifted one chip at a time in ascending order with respect to the transmission spread spectrum code.

As described above, the delay time of the reception spread spectrum code with respect to the transmission spread spectrum code corresponds to a range bin corresponding to the delay time, so by sequentially shifting the reception spread spectrum code with respect to the transmission spread spectrum code from 0 to m−1 chip (m is the total number of range bins), baseband signals corresponding to the detection radio waves reflected back from objects positioned in all range bins can be measured. The control unit 106 repeats the process of sequentially shifting the reception spread spectrum code with respect to the transmission spread spectrum code from 0 to m−1 chip k times. In other words, the control unit 106 sweeps k times.

As a result, a number of baseband signal data items equaling the product of m and k are stored in the signal memory unit 111. It should be noted that the reception antenna 105, the despreader 108, the demodulator 109, the filter 110, and the signal memory unit 111 are equivalent to the reception circuit, and the spread spectrum code delayed by the delay device 107 is equivalent to the second pseudo noise code.

Next, for each distance, the radar apparatus 100 discriminates the time series baseband signal based on each Doppler frequency, which is the difference between the frequency of the detection radio wave radiated by the transmission antenna 104 and the frequency of the detection radio wave received by the reception antenna 105 (S103). In other words, the radar apparatus 100 discriminates the time series baseband signal based on each Doppler bin, which is a segment of the Doppler frequency component.

Then, using the discrimination result of the Doppler filter 112, the radar apparatus 100 sets a threshold value for removing unwanted signals for each Doppler frequency (S104). In other words, the radar apparatus 100 sets a threshold value for each Doppler bin.

Figure 3:
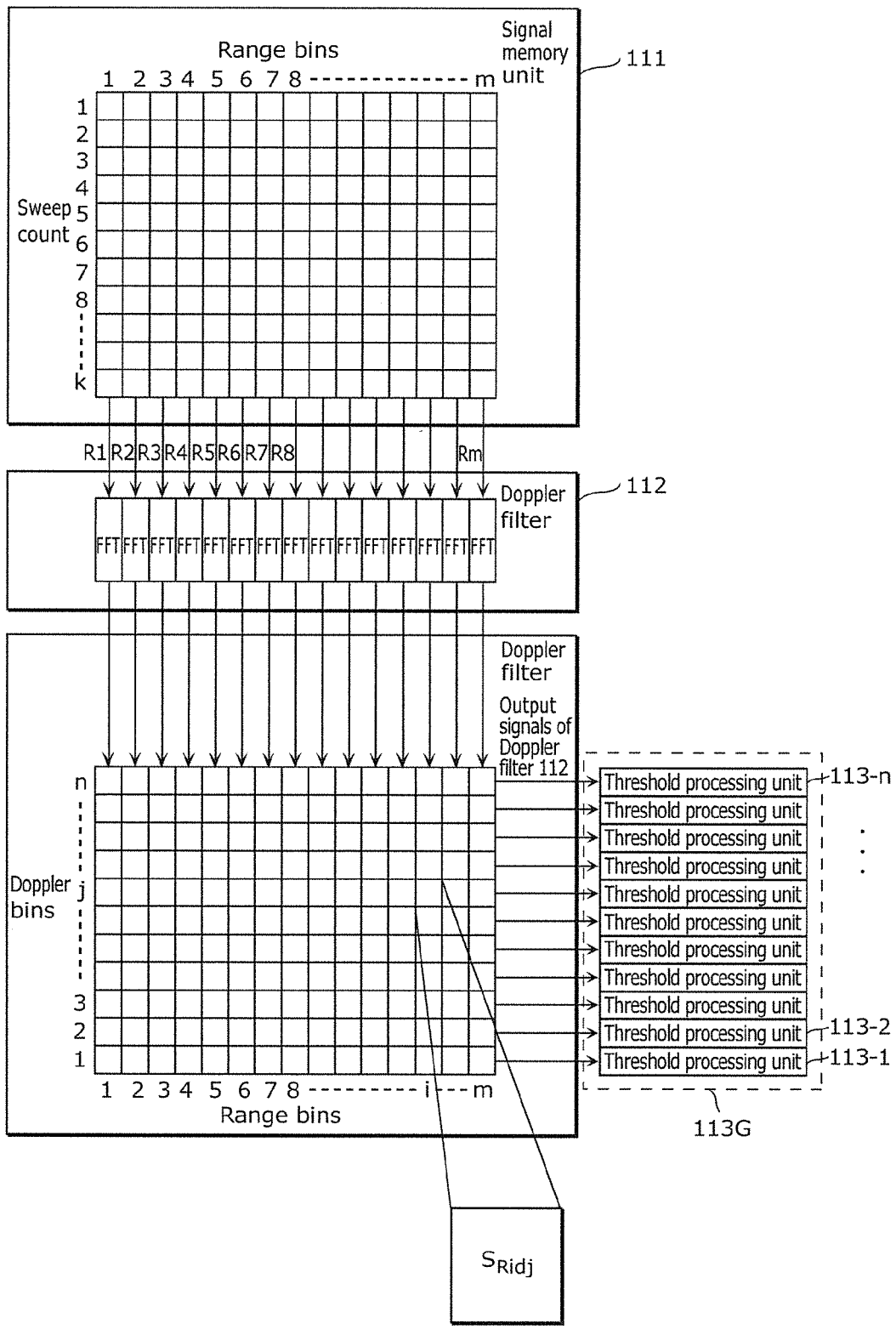
FIG. 3 is a diagram illustrating the discrimination process (S103 in FIG. 2) and the threshold setting process (S104 in FIG. 2).

FIG. 3 is a diagram illustrating the discrimination process (S103 in FIG. 2) and the threshold setting process (S104 in FIG. 2).

As FIG. 3 shows, the baseband signal obtained by sweeping k number of times is associated with a range bin and a sweep count and stored in the signal memory unit 111.

The Doppler filter 112 includes independent fast Fourier transformers, one for each range bin. Each of the fast Fourier transformers fast Fourier transforms (FFT) the k number of baseband signals belonging the same range bin in the discrimination process (S103). In other words, the Doppler filter 112 independently performs FFT on the baseband signals R1 through Rm.

The baseband signals on which FFT has been performed by the Doppler filter 112 are discriminated per Doppler frequency. In other words, for each range bin, they are discriminated on a per Doppler bin basis. The output signals of the Doppler filter 112, which are the discriminated baseband signals, are $S_{Ridj}$ signals ($1 \leq I \leq m$, $1 \leq j \leq n$) that have been segmented by both range bin and Doppler bin.

The threshold processing units 113-1 through 113-n included in the threshold processing unit group 113G are each provided in association with a Doppler bin, and calculate a threshold value for the corresponding Doppler bin using m number of output signals which belong to the corresponding Doppler bin. More specifically, the threshold processing unit 113-j calculates the threshold value for the j-th Doppler bin using the m number of output signals $S_{R1dj}$ through $S_{Rmdj}$. A detailed description of the threshold value calculation method will be described later.

Next, for each Doppler frequency, the threshold processing unit group 113G removes unwanted signals which are signals less than or equal to the calculated threshold value (S105). More specifically, each of the threshold processing units 113-1 through 113-n remove unwanted signals which are signals less than or equal to the calculated threshold value from among the output signals belonging to the corresponding Doppler bin.

Lastly, the estimation unit 114 estimates the position and speed of an object using the output signals removed of unwanted signals (S106). More specifically, the estimation unit 114 determines an object to be present in a range bin to which a peak value of the output signals removed of unwanted signals belongs, and estimates the distance to that range bin to be the distance to the object. Moreover, the estimation unit 114 estimates a speed corresponding to the Doppler bin to which a peak value of the output signals removed of unwanted signals belongs, to be the speed of the object.

With the above-described processes, the radar apparatus 100 independently removes unwanted signals from each Doppler bin, and estimates the position and speed of an object using the discrimination result removed of the unwanted signals.

Next, the threshold value setting process (S104 in FIG. 2) performed by each of the threshold processing units 113-1 through 113-n will be described.

Here, the threshold processing unit group 113G includes threshold processing units 113-1, 113-2 through 113-n having the same structure and provided in association with the input Doppler bins on a one-to-one basis. Details are shown in FIG. 4, which is a block diagram that shows the configuration of each threshold processing unit 113 in detail.

Each threshold processing unit 113 calculates a threshold value for the corresponding Doppler bin using a peak value (Pmax) that is the maximum value of the discrimination result in all of the range bins. Specifically, the threshold value is a higher one of a first threshold value determined from the peak value (Pmax) and a second threshold value determined from a noise floor of the discrimination result of the Doppler filter when there is no reception signal. Even more specifically, each threshold processing unit 113 sets the first threshold value as the product of an out-of-range leakage signal strength, which is the quotient of the signal strength of the peak value and an out-of-range signal suppression ratio based on the self-correlation characteristic of the first pseudo noise code, and a first allowance factor that is no less than one, and sets the second threshold value as the product of the signal strength of the noise floor and a second allowance factor that is no less than one. Moreover, the second allowance factor is greater than the first allowance factor.

Figure 4:
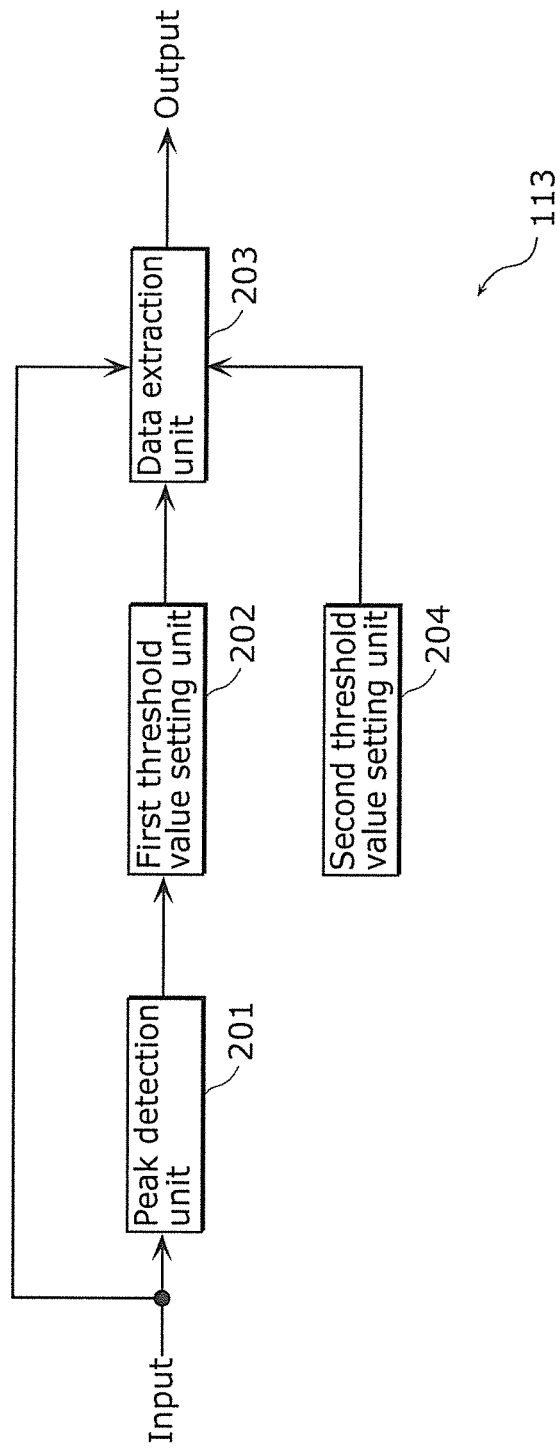
FIG. 4 is a block diagram showing the configuration of the threshold processing unit in detail.

As FIG. 4 shows, each threshold processing unit 113 includes a peak detection unit 201, a first threshold value setting unit 202, a data extraction unit 203, and a second threshold value setting unit 204. The input data is input in advance as a signal corresponding to single Doppler bin and associated with a range bin R. The peak detection unit 201 extracts the strongest data from the input signal and outputs the strength as Pmax. Next, using the out-of-range rejection ratio ORR of the spread spectrum code generated by the code generator 101, the first threshold value setting unit 202 sets the result of (Pmax/ORR)×A as the first threshold value TH1 (A is a value that is no less than one, and may be appropriately set based on a desired value of the false positive detection rate and true positive detection rate). Moreover, the second threshold value setting unit 204 sets the second threshold value TH2 so that the signal strength is increased against the noise floor of the signals for each Doppler bin (signal strength of the noise floor=NF) by an amount of minimum SN ratio determined from the desired value of the false positive detection rate and true positive detection rate.

The data extraction unit 203 only extracts from the input signal those signals stronger than the greater of the first threshold value TH1 and the second threshold value TH2 (hereinafter simply referred to as TH).

Figure 5A:
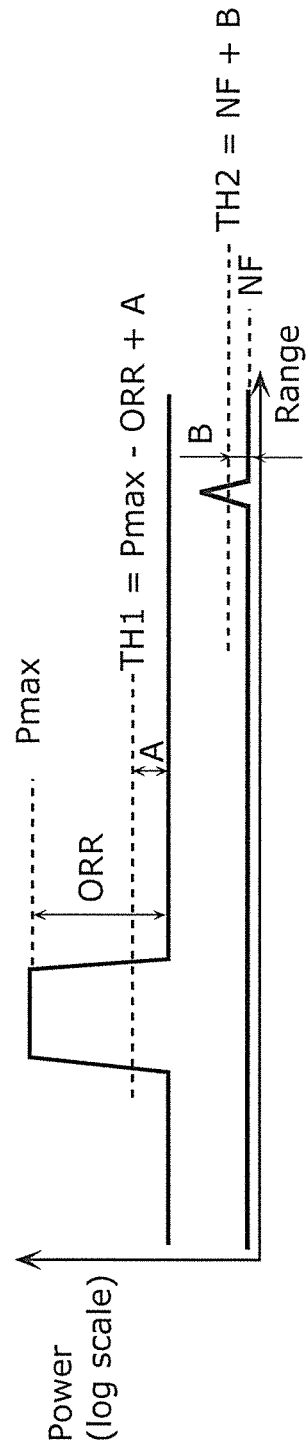
FIG. 5A illustrates the processing performed by the threshold processing unit when a large signal occupies a given Doppler bin.
Figure 5B:
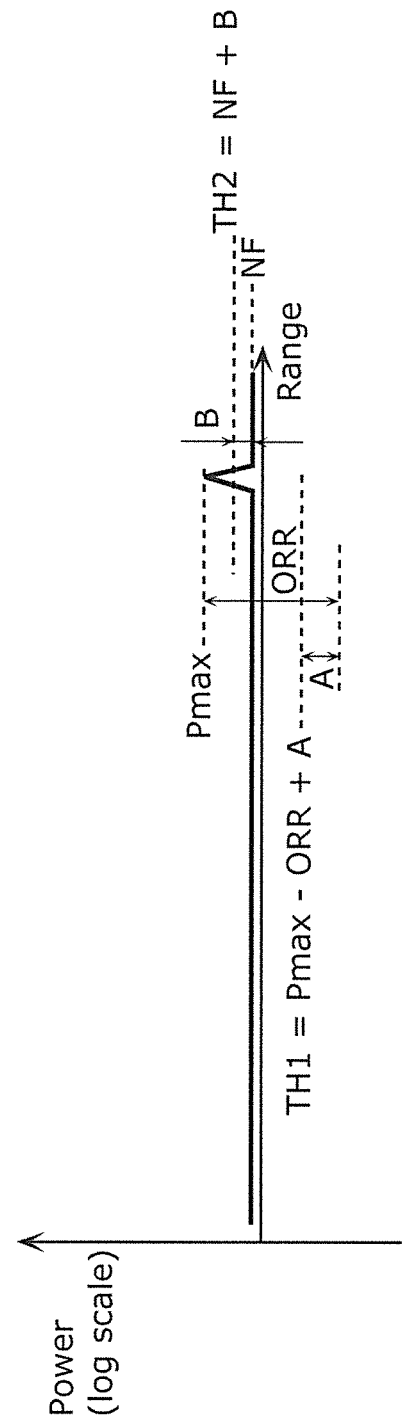
FIG. 5B illustrates the processing performed by the threshold processing unit when a large signal does not occupy a given Doppler bin.

With this, the signal extracted by the threshold processing unit 113 differs depending on if a large signal occupies or does not occupy a given Doppler bin. FIG. 5A illustrates the processing performed by the threshold processing unit 113 when a large signal occupies a given Doppler bin. FIG. 5B illustrates the processing performed by the threshold processing unit 113 when large signals does not occupy a given Doppler bin.

As FIG. 5A shows, when a large signal occupies a given Doppler bin, the first threshold value TH1 set by the first threshold value setting unit 202 exceeds the second threshold value TH2 set by the second threshold value setting unit 204. As such, the data extraction unit 203 sets the first threshold value TH1 as the threshold value and extracts and outputs only those signals stronger than the threshold value. In other words, when a large signal occupies the Doppler bin that corresponds to the threshold processing unit 113, the threshold processing unit 113 sets the threshold value greater than or equal to the out-of-range leakage signal strength determined from the peak strength Pmax and the ORR and outputs only those signals stronger than the threshold value to the estimation unit 114.

This allows the estimation unit 114 to avoid false positive detection in which an object is detected as being present in all range bins in a Doppler bin occupied by the large signal. Specifically, when the threshold value is lower than a leak strength determined from the peak strength Pmax and the ORR, signals are output to the estimation unit 114 in every range bin. As a result, the estimation unit 114 makes a false positive detection estimate that, for every range bin, a detection radio wave had been reflected from an object. In contrast, when a large signal exists, by setting the threshold value to be greater than or equal to the out-of-range leakage signal strength determined from the peak strength Pmax and the ORR, only those signals stronger than the threshold are output to the estimation unit 114. Consequently, the range bins from which the signals are output are limited and thus no influence is imposed from the out-of-range leakage signal (hereinafter also referred to as leakage signal) and thus an object can be accurately detected.

As FIG. 5B shows, when a large signal does not occupy a given Doppler bin, the second threshold value TH2 set by the second threshold value setting unit 204 exceeds the first threshold value TH1 set by the first threshold value setting unit 202. As such, the data extraction unit 203 sets the second threshold value TH2 as the threshold value and extracts and outputs only those signals stronger than the threshold value. In other words, when a large signal occupies the Doppler bin that corresponds to the threshold processing unit 113, the threshold processing unit 113 sets the threshold value greater than the noise floor NF and outputs only those signals stronger than the threshold value to the estimation unit 114.

This allows the estimation unit 114 to avoid a detection leak in which no object is estimated as being present in any of the range bins. In other words, no signal is output from any range bin to the estimation unit 114 when the threshold value is larger than the peak strength Pmax of a small signal. As a result, the estimation unit 114 makes a detection leak estimate that no detection radio wave had been reflected from any object from any of the range bins. In contrast, when no large signal exists, by making the threshold value greater than the noise floor NF, a small signal is output to the estimation unit 114 and thus a detection leak can be avoided and an object can be accurately detected. In other words, this makes it possible to increase the true positive detection rate.

Moreover, with the radar apparatus 100 according to Embodiment 1, the following advantageous aspects are achievable by independently performing the threshold value setting process (S104 in FIG. 2) and the unwanted signal removal process (S105 in FIG. 2) for each Doppler bin.

Figure 6:
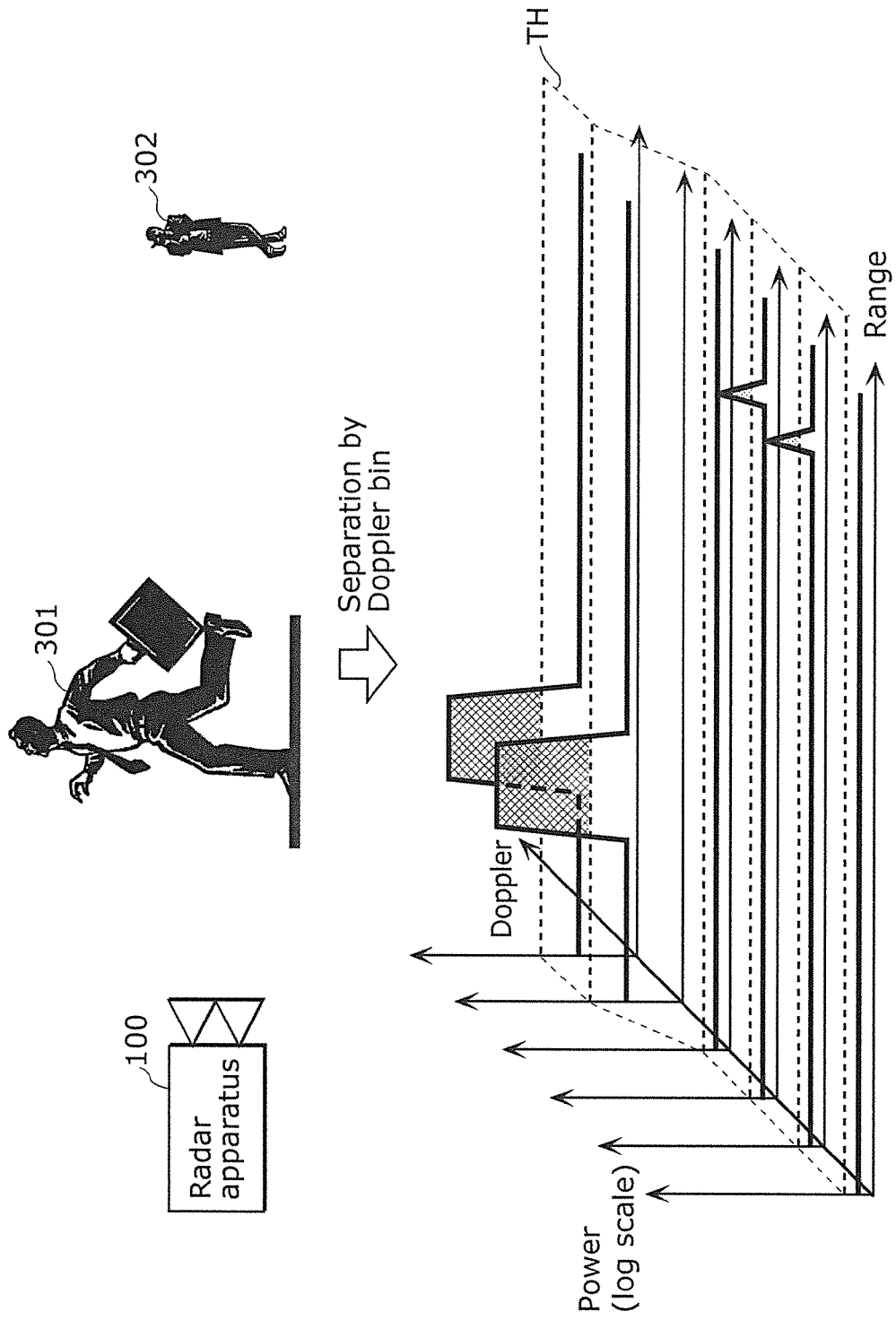
FIG. 6 is a diagram illustrating the threshold setting process (S104 in FIG. 2) and the unwanted signal removal process (S105 in FIG. 2) performed independently for each Doppler bin.

FIG. 6 illustrates the threshold value setting process (S104 in FIG. 2) and the unwanted signal removal process (S105 in FIG. 2) which are performed independently for each Doppler bin. Range bin (distance) is represented on the horizontal axis, signal strength is represented on the vertical axis, and Doppler bin (Doppler frequency) is represented depth-wise.

FIG. 6 shows an example of output signals (discrimination result) of the Doppler filter 112 when detection radio waves radiated from the radar apparatus 100 are reflected back from an object 301 and an object 302. The signal strength of the detection radio wave reflected back from the object 302 is weaker than the leakage signal strength determined from the signal strength of the detection radio wave reflected back from the object 301 and the ORR. Moreover, the object 301 is close in distance to the radar apparatus 100 and is traveling while the object 302 is far in distance from the radar apparatus 100 and is nearly standstill.

The output signals (discrimination result) of the Doppler filter 112 is separated into an n number of individual signals each corresponding to a Doppler bin and input into an n number of threshold processing units 113-1 through 113-n. In other words, the baseband signals corresponding to the detection radio waves reflected back from the objects 301 and 302 are separated and output by Doppler bin by the Doppler filter 112.

The resulting Doppler filter 112 output signals corresponding to each of the objects 301 and 302 are as follows.

Since the object 301 is traveling and the object 302 is practically standstill, the Doppler filter 112 output signals corresponding to the object 301 and the Doppler filter 112 output signals corresponding to the object 302 correspond to mutually different Doppler bins. Moreover, since the object 301 is close to the radar apparatus 100 and the object 302 is far from the radar apparatus 100, the peak of the Doppler filter 112 output signals corresponding to the object 301 and the peak of the Doppler filter 112 output signals corresponding to the object 302 correspond to mutually different range bins.

Here, when the Doppler bins to which the Doppler filter 112 output signals corresponding to the object 302 are output are D1 and D2 and the Doppler bins to which the Doppler filter 112 output signals corresponding to the object 301 are output are D3 and D4, the threshold processing units 113 corresponding to the Doppler bins D1 through D4 operate as follows.

First, the threshold processing unit 113 corresponding to Doppler bin D1 compares the first threshold value TH1 and the second threshold value TH2. Since no large signal occupies Doppler bin D1, the threshold processing unit 113 corresponding to Doppler bin D1 determines that the second threshold value TH2 is larger than the first threshold value TH1. As such, the threshold processing unit 113 corresponding to Doppler bin D1 sets the threshold value TH to be the second threshold value TH2. The result is the same for the threshold processing unit 113 corresponding to Doppler bin D2.

In contrast, the threshold processing unit 113 corresponding to Doppler bin D3 compares the first threshold value TH1 and the second threshold value TH2 and determines that the first threshold value TH1 is larger than the second threshold value TH2 since a large signal occupies Doppler bin D3. As such, the threshold processing unit 113 corresponding to Doppler bin D3 sets the threshold value TH to be the first threshold value TH1. The result is the same for the threshold processing unit 113 corresponding to Doppler bin D4.

It should be noted that the threshold processing units 113 other than those corresponding to Doppler bins D1 through D4 set the threshold value TH to be the second threshold value TH2.

As described above, the threshold processing unit group 113G individually sets the threshold value TH for each Doppler bin.

With this configuration, even signal detection is performed for the object 302 which returns reflection signals that are weaker than the leakage signal strength determined by the ORR, by separating the reflection signal per Doppler bin and differentiating them from leakage signals. This allows for false positive detection to be avoided and the true positive detection rate to be improved. In other words, different threshold values are set for (i) the Doppler bins D1 and D2 corresponding to the object 302 and (ii) the Doppler bins D3 and D4 corresponding to the object 301. This makes it possible to detect the object 302, which returns reflection signals that are weaker than the leakage signal strength of the detection radio waves reflected from the object 301. It should be noted that the reflection signal is a detection radio wave that has been reflected off an object.

Figure 7:
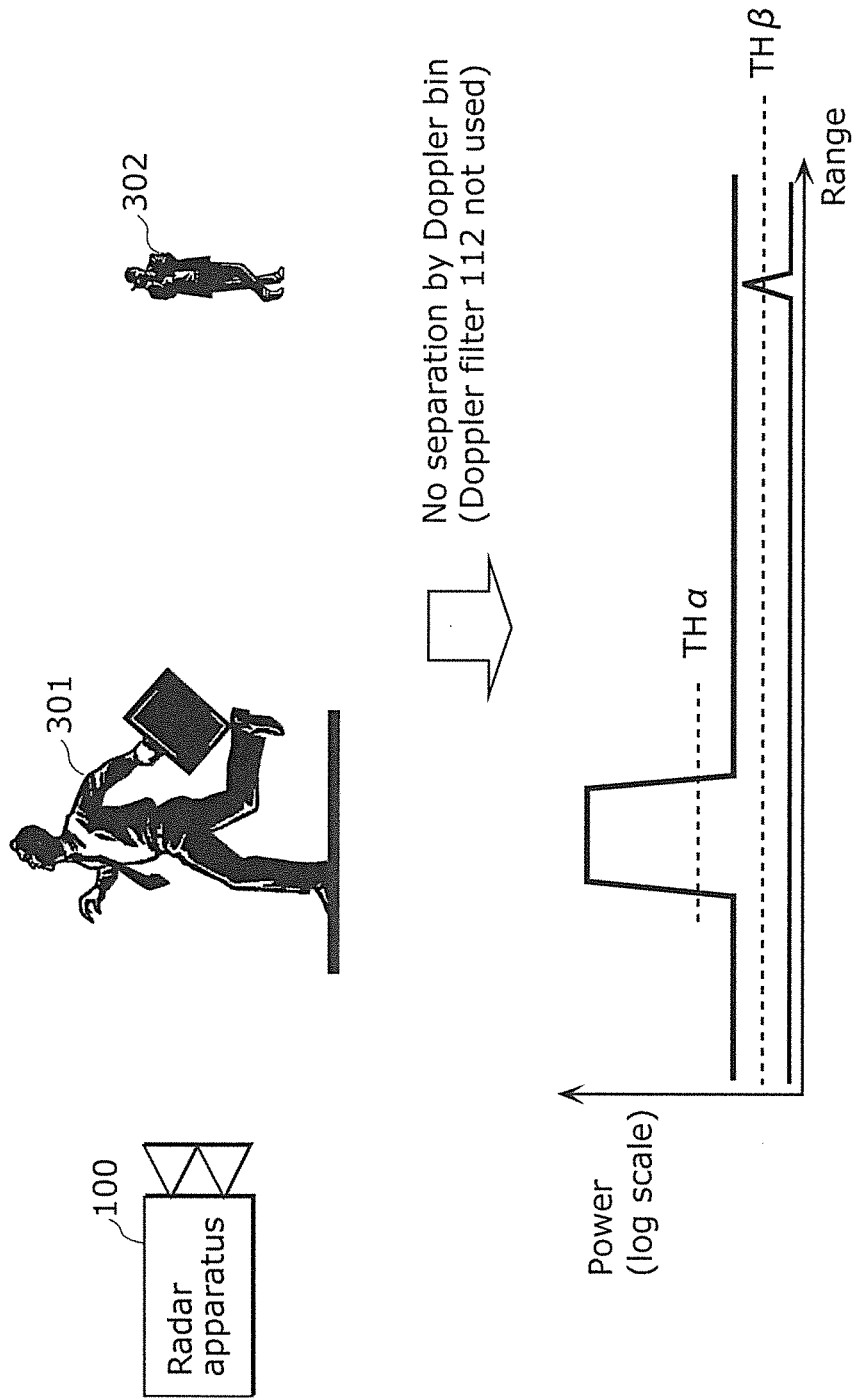
FIG. 7 is a comparative example which illustrates a problem that may arise when separation per Doppler bin is not performed.

Here, as a comparison, an example in which detection radio waves reflected off the objects 301 and 302 are not separated per Doppler bin will be described. FIG. 7 is a comparative example which illustrates a problem that may arise when separation per Doppler bin is not performed.

When separation per Doppler bin is not performed, signals corresponding to the traveling object 301 and signals corresponding to the traveling object 302 can not be separated, so the reflection signals from the object 302 get buried by leakage signals of the reflection signal from the object 301 and cannot be observed.

In other words, when the threshold value is set to be THα which is a value greater than the leakage signal strength determined by the signal strength of the object 301 and the ORR, reflection signals from the object 302 are removed as unwanted signals. This results in a detection leak of the object 302.

Moreover, when the threshold value is lowered to a value THβ at which the object 302 can be observed, leakage signals from the object 301 cannot be removed. This results in a false positive detection in which objects are detected to occupy every range bin.

In contrast, the radar apparatus 100 according to Embodiment 100 is capable of avoiding false positive detection and improving the true positive detection rate by individually setting a threshold value TH for each Doppler bin.

As described above, the radar apparatus 100 according to Embodiment 1 is a spread spectrum radar apparatus that detects an object by use of a detection radio wave that is spectrum-spread and includes: a transmission circuit that generates a spread spectrum signal and radiates the spread spectrum signal as the detection radio wave, the spread spectrum signal being spectrum-spread by combining an oscillating signal and a first pseudo noise code; a reception circuit that receives the detection radio wave reflected back from the object as a reception signal, extracts, based on (i) a second pseudo noise code obtained by time-delaying the first pseudo noise code and (ii) the oscillating signal, a signal of a specific frequency band from a despread output of the reception signal, and generates baseband signals by separating the extracted signal by distance, each of the distances corresponding to an amount of time delay between the first pseudo noise code and the second pseudo noise code; a Doppler filter 112 that, for each of the distances, discriminates a time series of the baseband signals based on Doppler frequencies to output output signals, each of which indicates a strength and is associated with one of the distances and one of the Doppler frequencies, the Doppler frequencies each being a difference between a frequency of the detection radio wave radiated from the transmission circuit and a frequency of the detection radio wave received by the reception circuit; a removal unit that includes a plurality of threshold processing units 113-1 through 113-n provided corresponding to the Doppler frequencies resulting from the discrimination and is configured to remove an unwanted signal from the output signals output by the Doppler filter 112; and an estimation unit 114 configured to estimate a position and a speed of the object from the output signals removed of the unwanted signal, wherein each of the threshold processing units 113-1 through 113-n is configured to calculate a threshold value for a corresponding one of the Doppler frequencies using a peak value which is a maximum value of the output signals in a range of distance corresponding to a detection area for the object, and determine the output signals in the range of distance that are no greater than the calculated threshold value to be the unwanted signal.

With this, it is possible to detect a detection radio wave having a low signal strength even when a detection radio wave reflected off one object and having a low signal strength and a detection radio wave reflected off another object and having a high signal strength are present. In other words, it is possible to detect the one object. Specifically, since it is possible to independently set a threshold value for each Doppler bin, it is possible to detect a small signal even when a large signal and a small signal are present if their respective Doppler bins are different.

Moreover, when the first threshold value TH1 is smaller than the second threshold value TH2 determined from the noise floor of the signals in each Doppler bin, the threshold processing unit 113 sets the second threshold value TH2 as the threshold value TH and extracts those signals stronger than the second threshold value TH2. In other words, the threshold value TH is the greater of the first threshold value TH1 determined from the peak value Pmax and the second threshold value TH2 determined from the noise floor of the output signals of the Doppler filter 112 when no detection radio waves are reflected from an object.

With this, it is possible to prevent false positive detection from occurring due to a noise floor defined by system thermal noise and the like, and optimally maintain the false positive detection rate and true positive detection rate.

Moreover, the first threshold value TH1 is the product of an out-of-range leakage signal strength, which is the quotient of the signal strength of the peak value Pmax and an out-of-range signal suppression ratio (ORR) based on the self-correlation characteristic of the spread spectrum code, and a first allowance factor A that is no less than one, and the second threshold value TH2 is the product of the signal strength of the noise floor NF and a second allowance factor B that is no less than one.

With this, it is possible to perform signal detection by separating the reflection signal per Doppler bin and differentiating them from leakage signals, even for an object which returns reflection signals that are weaker than the leakage signal strength determined by the ORR. As a result, it is possible to avoid false positive detection while improving the true positive detection ratio.

Moreover, since the ORR is determined by the self-correlation characteristic of the spread spectrum code, the out-of-range leakage signal strength is nearly uniquely calculated. As such, even if the value of the first allowance factor A is low, there is little concern that false positive detection due to detection of the out-of-range leakage signal will occur. In contrast, since the noise floor is defined by system thermal noise, the level wavers greatly. Consequently, false positive detection due to the detection of noise can be avoided by increasing the value of the second allowance factor B.

Moreover, the second allowance factor B may be a value that is greater than half of the noise variations when no detection radio waves are reflected back from an object.

Moreover, with the radar apparatus 100 according to Embodiment 1, since detection of a reflection signal is performed by the Doppler filter 112 separately for each Doppler bin, which is a segment of the Doppler frequency component, it is possible to estimate a relative speed of an object relative to the radar apparatus 100 with the estimation unit 114.

In other words, the estimation unit 114 estimates the distance to an object using distance data indicating a distribution of strength with respect to the distances from the radar apparatus 100 in each of the Doppler frequencies, from among the output signals removed of the unwanted signal, and estimates the speed of an object using Doppler frequency data indicating a distribution of strength with respect to the Doppler frequencies in each of the distances, from among the output signals removed of the unwanted signal and in a given range of distance from the estimated distance. Specifically, the estimation unit 114 estimates the distance of an object from range bins corresponding to the peak values of the distance data occupying each Doppler bin, and estimates the speed of an object from peak values of Doppler frequency data, which indicates the distribution of strength with respect to the Doppler bins, occupying the range bins corresponding to the peak values of the distance data.

Variation of Embodiment 1

The radar apparatus according to this Variation is nearly identical to the radar apparatus according to Embodiment 1, but further includes object tracking processing. Specifically, the estimation unit 114 performs object tracking using a time series of the estimated distance to and speed of an object.

In this kind of object tracking, the radar apparatus according to this Variation extracts a signal stronger than or equal to TH, calculates the distance thereof, determines signals within a given range of distance from the calculated distance to be reflection signals from the same object, averages the Doppler frequencies of the individual signals determined to be from the same object, and uses the average as a representative value of the speed of the object to perform object position tracking. The Doppler frequencies are, for example, averaged by weighting by signal strength. This has an advantageous effect of improving estimation accuracy by suppressing the influence of error in speed calculated from low strength signals. In this case, especially when the detected target is a non-rigid body such as a person, the speed is widely distributed, and as such, if the whole range is averaged, it is possible to yield an approximate value of the traveling speed of the object showing the movement of the object on a large scale.

In other words, in the radar apparatus according to this Variation, the estimation unit estimates the distance from the object using distance data indicating a distribution of strength with respect to the range bins in each of the Doppler bins, from among the discrimination results removed of unwanted signals, estimates the speed of the object using Doppler frequency data indicating a distribution of strength with respect to the Doppler bins in each of the range bins, from among the discrimination results removed of unwanted signals and in a given range of distance from the estimated distance, and furthermore, performs object tracking based on a time series of the estimated distances and speeds of the object. Methods for tracking the object based on a time series of the estimated distances and speeds of the object include, for example, tracking the path of the object based on a time series of a measured value and a predicted value using a Kalman filter.

In other words, the radar apparatus according to this Variation determines detection radio waves returning from within a given range of distance from an estimated distance to be detection radio waves reflecting back from the same object, and estimates the speed of the object using Doppler frequency data of discrimination results in range bins falling within the range of distance.

With this, it is possible to accurately track an object. Specifically, since it is possible to estimate distance and speed using distance data and Doppler frequency data corresponding to a detection radio wave having a low signal strength detected by independently setting a threshold value for each Doppler bin, tracking can be performed more accurately than when discrimination is not performed with respect to each Doppler bin.

The speed of the object may be estimated from the peak value of the Doppler frequency data or may be estimated by weighting the Doppler frequency data by use of signal strength. However, speed estimation accuracy is improved by estimating the speed of the object by weighting the Doppler frequency data by use of signal strength since it is possible suppress influence from signals having a small strength.

Embodiment 2

With the object tracking by the radar apparatus according to the Variation of Embodiment 1 described above, when there is a signal within the range of distance corresponding to the object that has been removed as a result of being less than or equal to TH1, a portion of the speed distribution is not included in the calculation of the average, and thus it is possible that a deviation between the actual traveling speed and the estimated speed of the object will increase.

For this reason, the radar apparatus according to Embodiment 2 deals with this sort of deviation between the actual traveling speed and the estimated speed by using a flag which indicates that the speed distribution is incomplete with respect to the output signal of each threshold processing unit 113. In other words, estimation of the traveling speed of an object showing the movement of the object on a large scale is avoided by using an output signal set with a flag. When a flag is set, speed is estimated using only distance, or in other words, estimated from the change in distance of the moving object. The flag can be set in the following way. In the data extraction unit 203 in the threshold processing unit 113, when there is a signal that is greater than TH2 and less than TH1, the range bin R to which the signal belongs is determined to be an incomplete Doppler spectrum range bin Rd (hereinafter also simply referred to as range bin Rd), and flags are set for all signals belonging to the Range bin Rd.

In other words, the radar apparatus according to Embodiment 2 is nearly identical to the radar apparatus according to Embodiment 1 with respect to the performing of object tracking, but is different in the following way.

When there is a signal that is greater than TH2 and less than TH1 in at least one Doppler bin in one range bin R, the radar apparatus according to Embodiment 2 determines that there is a possibility that a detection radio wave returning back from the one range bin R is buried by a leakage signal of a detection radio wave returning back from another range bin R, and turns on a speed incomplete flag indicating that the one range bin R is an incomplete Doppler spectrum range bin Rd. Then, for the speed incomplete flagged range bin Rd, the radar apparatus according to Embodiment 2 does not perform speed estimation from the detection radio waves returning back from the range bin Rd; the radar apparatus only performs distance estimation.

Hereinafter, the radar apparatus according to Embodiment 2 will be described based on its differences with the radar apparatus according to Embodiment 1 and the radar apparatus according to the Variation of Embodiment 1.

Figure 8:
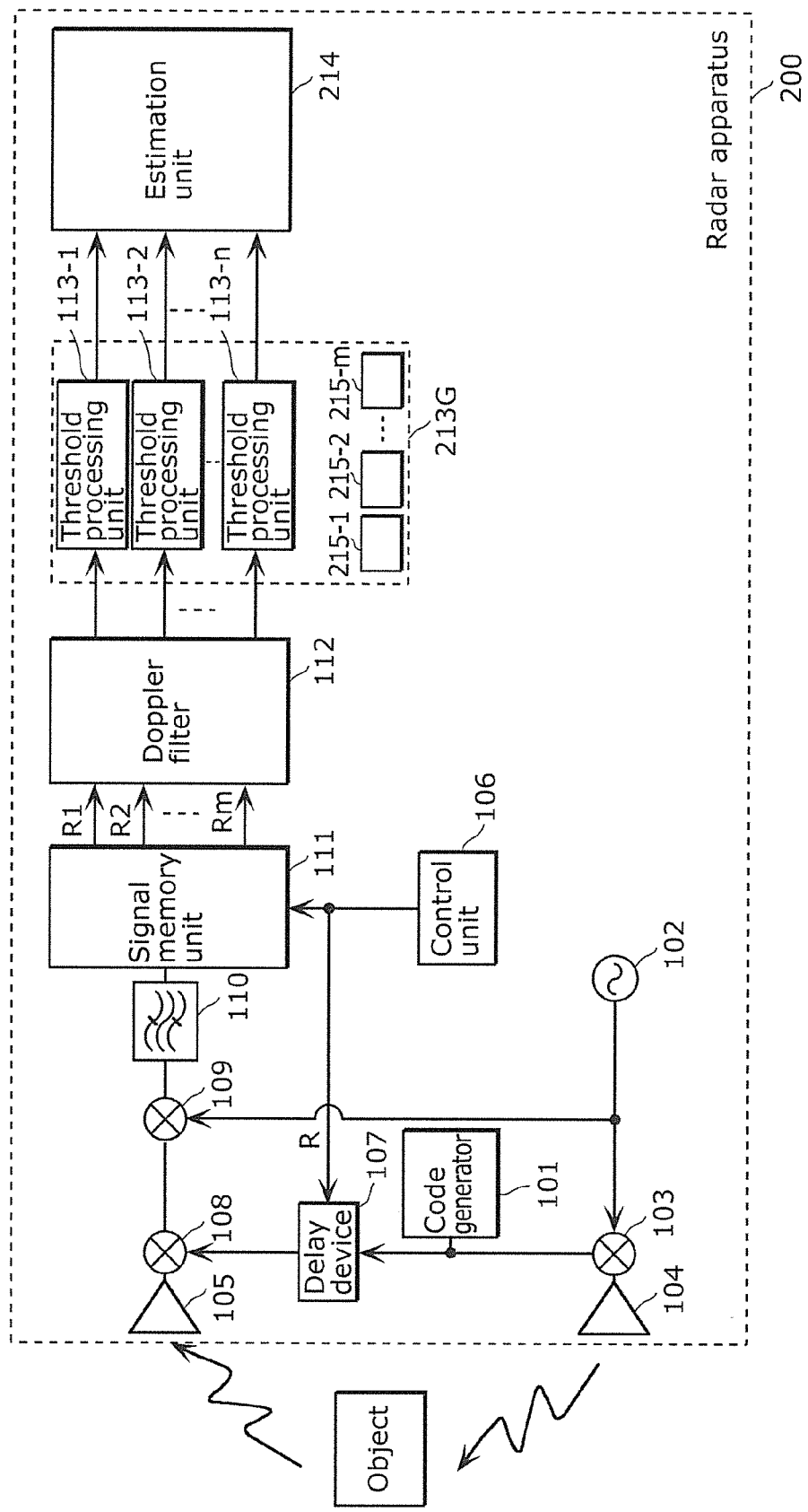
FIG. 8 is a block diagram showing the configuration of the radar apparatus according to Embodiment 2.

FIG. 8 is a block diagram showing the configuration of the radar apparatus according to Embodiment 2.

The radar apparatus 200 shown in FIG. 8 is practically identical to the radar apparatus 100 according to Embodiment one, but includes a threshold processing unit group 213G and a estimation unit 214 instead of the threshold processing unit group 113G and the estimation unit 114.

In contrast to the threshold processing unit group 113G, the threshold processing unit group 213G includes m number of speed incomplete flags 215-1 through 215-$m$ that are provided corresponding to m number of range bins and indicate that corresponding range bin Doppler frequency data from among the discrimination results is incomplete, and when there are signals that are lower in strength than the first threshold value TH1 and higher in strength than the second threshold value TH2 among the discrimination results, the speed incomplete flags 215-1 through 215-*m* that correspond to the range bin to which the signal belongs are turned on. Here, since the Doppler frequency corresponds to the speed of the object relative to the radar apparatus 200, incomplete Doppler frequency data correlates to an incomplete speed distribution. It should be noted that hereinafter, the speed incomplete flags 215-1 through 215-*m* are not distinguished from each other in particular, and in some instances are simply referred to as the speed incomplete flag 215.

Specifically, the data extraction unit 203 in a threshold processing unit 113-*j* that corresponds to the j-th Doppler bin calculates the TH1 from m number of output signals $S_{R1dj}$ through $S_{Rmdj}$. Then, if an output signal $S_{Ridj}$ that is greater than TH2 and less than TH1 exists, the data extraction unit 203 turns on a speed incomplete flag 215-*i* corresponding to the i-th range bin. In other words, the data extraction unit 203 determines that the Doppler frequency data for the i-th range bin is incomplete, and turns on the speed incomplete flag 215-*i* corresponding to the i-th range bin.

In contrast to the estimation unit 114 according to the Variation of Embodiment 1, when at least one of speed incomplete flags 215 corresponding to range bins in a given range of distance from the estimated distance is turned on, the estimation unit 214 omits the Doppler frequency data for the range bins to which the speed incomplete flags 215 correspond and estimates the distance of the object. In other words, the estimation unit 214 does not perform speed estimation using the Doppler frequency of the reflection signal for range bins flagged with the speed incomplete flag 215.

Specifically, the estimation unit 214 estimates the speed from a time series of the estimated distance for range bins flagged with the speed incomplete flag 215.

As described above, in the radar apparatus 200 according to Embodiment 2, the threshold processing unit group 213G includes m number of speed incomplete flags 215-1 through 215-*m* that are provided in association with range bins on a one-to-one basis and indicate that corresponding range bin Doppler frequency data from among the discrimination results is incomplete, and when there are signals that are lower in strength than the first threshold value TH1 and higher in strength than the second threshold value TH2 among the discrimination results from the Doppler filter 112, the speed incomplete flags 215-1 through 215-*m* that correspond to the range bin to which the signal belongs are turned on.

With the above configuration, the possibility of erroneously estimating the traveling speed by averaging an incomplete speed distribution is avoided, thereby improving object tracking accuracy.

Figure 9:
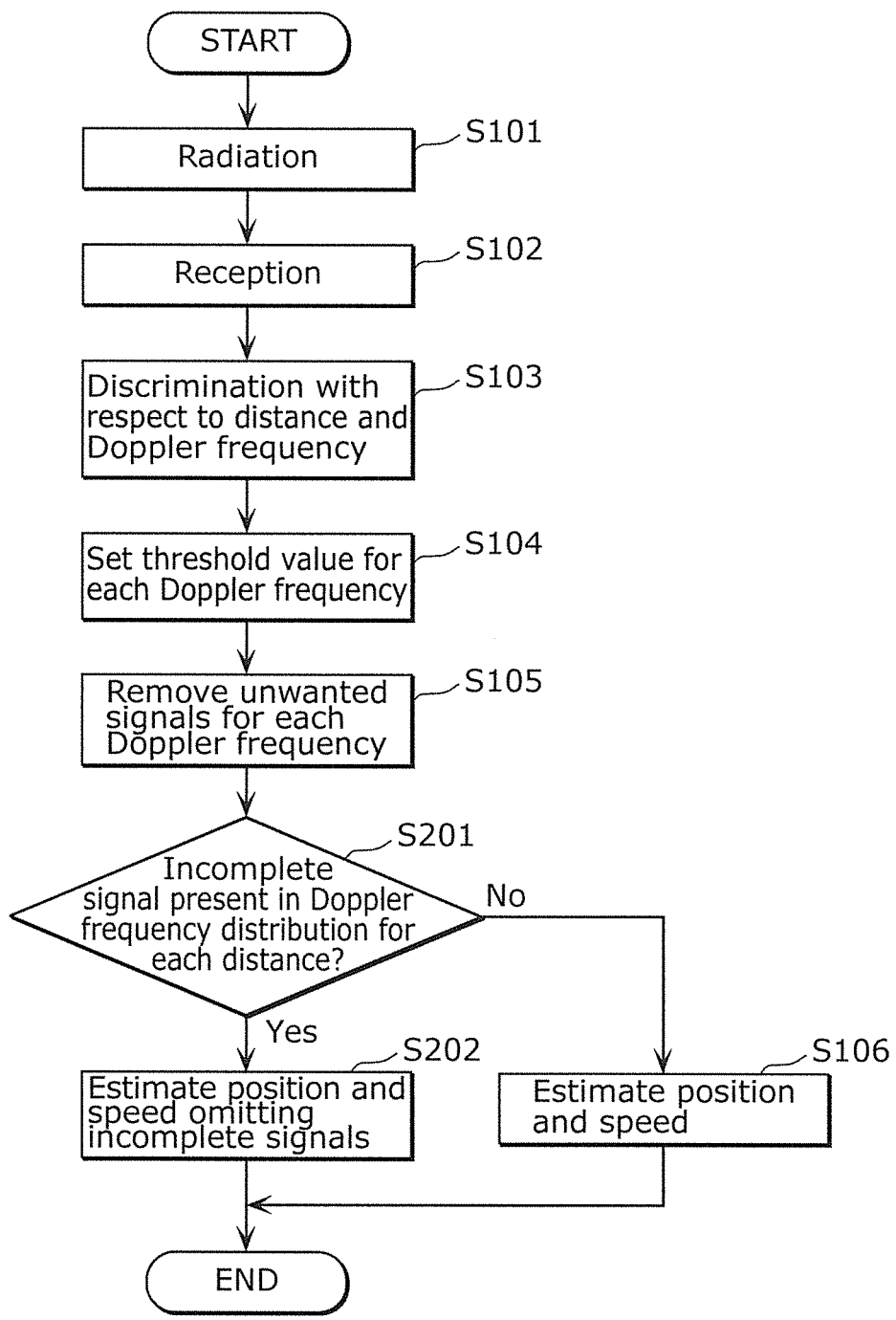
FIG. 9 is a flow chart showing an operation of the radar apparatus.
Figure 10:
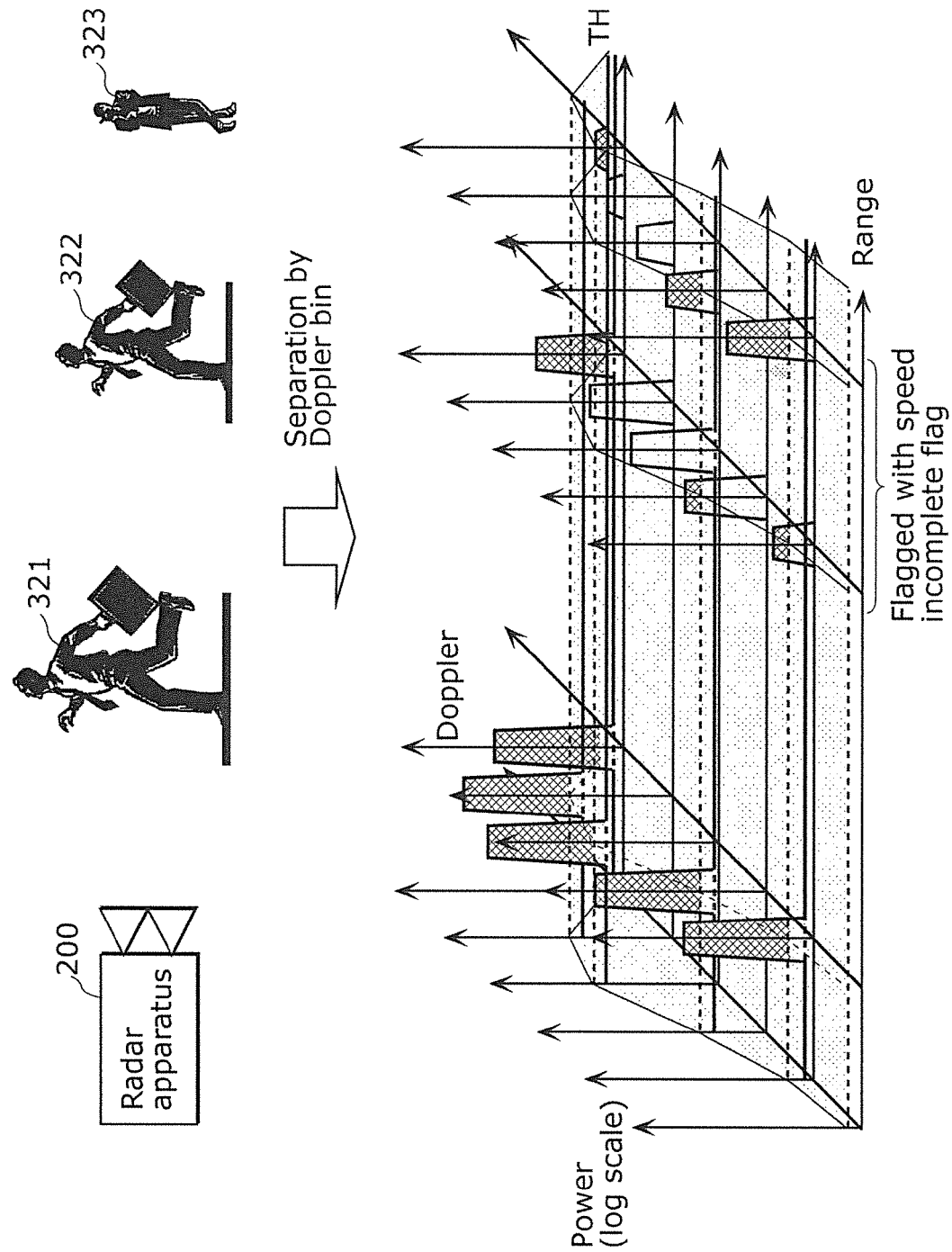
FIG. 10 is a diagram illustrating an operation of the radar apparatus.

Next, an operation of the radar apparatus 200 according to Embodiment 2 will be described. FIG. 9 is a flow chart showing an operation of the radar apparatus 200 according to Embodiment 2. FIG. 10 is a drawing illustrating the operation of the radar apparatus 200 and is an example of the discrimination results of the Doppler filter 112 when detection radio waves radiated from the radar apparatus 200 are reflected off objects 321 through 323. As FIG. 10 shows, a portion of the Doppler frequency data of the reflection signals from the objects 322 and 323 is smaller than the leakage signal strength determined from the signal strength of the reflection signal from the object 321 and the ORR.

The operation of the radar apparatus 200 is nearly identical to the operation of the radar apparatus 100 shown in FIG. 2, but the process performed after the unwanted signal removal process (S105) is different.

The threshold processing unit group 213G determines whether there is an incomplete signal in the Doppler frequency distribution for each distance (S201) after the unwanted signal removal process (S105). In other words, the threshold processing unit group 213G determines whether there is a signal that is lower in strength than the first threshold value TH1 and higher in strength than the second threshold value TH2, and when it is determined that there is a signal that is lower in strength than the first threshold value TH1 and higher in strength than the second threshold value TH2, turns on one of the speed incomplete flags 215-1 through 215-*m* that corresponds to the range bin to which the signal belongs.

When there is an incomplete signal (yes in S201), the estimation unit 214 estimates the position and speed of the object without taking into account the incomplete signal (S202). Specifically, when at least one of speed incomplete flags 215 corresponding to range bins in a given range of distance from the estimated distance is turned on, the estimation unit 214 omits the Doppler frequency data for the range bins to which the speed incomplete flags 215 correspond and estimates the distance of the object. In other words, the estimation unit 214 does not perform speed estimation using Doppler frequency data.

Moreover, the estimation unit 214 estimates the speed from a time series of the estimated distance for range bins flagged with the speed incomplete flag 215.

For example, as FIG. 10 shows, the Doppler frequency data of the detection radio wave reflecting back from the objects 322 and 323 is incomplete, as a portion of Doppler bin signals have been removed. In this case, as described above, when a signal that is greater than TH2 and less than TH1 is present, the speed incomplete flag 215 that corresponds with the range bin to which the signal belongs is turned on by the data extraction unit 203, and as such the speed incomplete flag 215 for the Doppler bin corresponding to the object 322 and the speed incomplete flag 215 for the Doppler bin corresponding to the object 323 are turned on.

Consequently, the estimation unit 214 does not use Doppler frequency data in the speed estimation of the objects 322 and 323. Instead, the estimation unit 214 estimates the traveling speeds of the objects 322 and 323 from the time series of the distance of the objects 322 and 323 estimated by the estimation unit 214.

On the other hand, when there are no incomplete signals (no in S201), the estimation unit 214 performs the previously described estimation process (S106) regarding position and speed. In other words, the estimation unit 214 estimates the distance from the object using distance data, and estimates the speed of the object using Doppler frequency data.

In this way, the estimation unit 214 does not perform estimation of traveling speed of the object showing the movement of the object on a large scale using range bins flagged with the speed incomplete flag 215. In other words, when the object is a non-rigid object (for example, a person), the estimation unit 214 does not perform estimation of traveling speed of the object using a Doppler frequency obtained by averaging the Doppler frequencies of each portion (for example, head, torso, hands and/or feet). The estimation unit 214 estimates the speed of the object from variations in distance for range bins flagged with the speed incomplete flag 215.

It should be noted that for range bins not flagged with the speed incomplete flag 215, the estimation unit 214 estimates distance from the object using distance data, and estimates the speed of the object using Doppler frequency data.

As described above, in the radar apparatus 200 according to Embodiment 2, the threshold processing unit group 213G includes m number of speed incomplete flags 215-1 through 215-*m* that are provided in association with range bins on a one-to-one basis and indicate that corresponding range bin Doppler frequency data from among the discrimination results is incomplete, and when there are signals that are lower in strength than the first threshold value TH1 and higher in strength than the second threshold value TH2 among the discrimination results, the speed incomplete flags 215-1 through 215-$m$ that correspond to the range bin to which the signal belongs are turned on.

For example, as FIG. 10 shows, when the objects 321 through 323 are non-rigid bodies such as people, the Doppler frequency data corresponding to each object 321 through 323 have a signal strength greater than the noise floor of the Doppler bin corresponding to the speed of each portion (for example, head, torso, hands and/or feet) of the objects 321 through 323. When the reflection signal of the object 321 is large, a portion of the discrimination results for each range bin and each Doppler bin of reflection signals from the objects 322 and 323 is buried by a leakage signal of a reflection signal from the object 321. In other words, a portion of the Doppler frequency data for the objects 322 and 323 are masked by a leakage signal strength of a reflection signal from the object 321. Consequently, the threshold processing unit group 213G turns on speed incomplete flags 215 corresponding to range bins in which the objects 322 and 323 are positioned.

With this, when a portion of the Doppler frequency data indicating the distribution of signal strength relative to Doppler frequency for a reflected wave from an object is masked by a leakage signal of a large signal having (i) a Doppler frequency included in the Doppler frequency data for the object and (ii) a range bin different than the object, it is possible to, for example, designate the traveling speed without using Doppler frequency data corresponding to the object in a processing unit at the later stage of the threshold processing unit group 213G. As a result, it is possible to optimize the later stage processing of the threshold processing unit group 213G and reduce the deviation between the actual traveling speed and the estimated speed of the object by using the Doppler frequency data corresponding to the object.

Moreover, when at least one of speed incomplete flags 215 corresponding to range bins in a given range of distance from the estimated distance is turned on, the estimation unit 214 omits the Doppler frequency data for the range bins to which the speed incomplete flags 215 correspond and estimates the distance of the object. In other words, the estimation unit 214 does not perform speed estimation using the Doppler frequency of the reflection signal for range bins flagged with the speed incomplete flag 215.

With this, it is possible to reduce the deviation between the actual traveling speed and the estimated speed of the object by estimating the distance of the object using incomplete Doppler frequency data which is the original Doppler frequency data that is partially masked.

For example, in FIG. 10, from among the Doppler frequency data for the objects 322 and 323, assume the masked Doppler bins correspond to the torso and the unmasked Doppler bins correspond to the head, hands, and feet. In this case, when the estimation unit 214 estimates the traveling speed of the objects 322 and 323 using incomplete Doppler frequency data, the speed of the torso is not taken into consideration in the estimation of the traveling speed. As a result, the deviation between the actual traveling speed and the estimated speed increases. In contrast, by not using the Doppler frequency data in range bins flagged with the speed incomplete flag 215 in the estimation of the traveling speed, the deviation between the actual traveling speed and the estimated speed decreases.

Moreover, the estimation unit 214 estimates the speed from a time series of the estimated distance for range bins flagged with the speed incomplete flag 215.

With this, it is possible to estimate speed for range bins flagged with a speed incomplete flag without using incomplete Doppler frequency data. For example, in FIG. 10, speed incomplete flags 215 corresponding to range bins in which the objects 322 and 323 are positioned are turned on. Here, the estimation unit 214 presumes that, for example, the objects 322 and 323 are uniform in motion from the time series of each the distances of the objects 322 and 323, and estimates the speed of each of the objects 322 and 323.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the radar apparatus according to each of the embodiments is a program described below.

The program causes a computer to execute a method of controlling a spread spectrum radar apparatus that detects an object by use of a detection radio wave that is spectrum-spread, the method including: generating a spread spectrum signal and radiating the spread spectrum signal as the detection radio wave, the spread spectrum signal being spectrum-spread by combining an oscillating signal and a first pseudo noise code; receiving the detection radio wave reflected back from the object as a reception signal, extracting, based on (i) a second pseudo noise code obtained by time-delaying the first pseudo noise code and (ii) the oscillating signal, a signal of a specific frequency band from a despread output of the reception signal, and generating baseband signals by separating the extracted signal by distance, each of the distances corresponding to an amount of time delay between the first pseudo noise code and the second pseudo noise code; discriminating, for each of the distances, a time series of the baseband signals based on Doppler frequencies to output output signals, each of which indicate a strength and is associated with one of the distances and one of the Doppler frequencies, the Doppler frequencies each being a difference between a frequency of the detection radio wave radiated from the transmission circuit and a frequency of the detection radio wave received by the reception circuit; removing an unwanted signal from the output signals output in the discriminating; and estimating a position and a speed of the object from the output signals removed of the unwanted signal, wherein the removing includes: calculating a threshold value for a corresponding one of the Doppler frequencies using a peak value which is a maximum value of the output signals in a range of distance corresponding to a detection area for the object, the threshold value being for removing the unwanted signal, and removing signals in each of the Doppler frequencies that are no greater than the calculated threshold value.

The herein disclosed subject matter is to be considered descriptive and illustrative only, and the appended Claims are of a scope intended to cover and encompass not only the particular embodiments disclosed, but also equivalent structures, methods, and/or uses.

For example, in the above embodiments, the threshold value TH calculated by the threshold processing unit 113 is made to be the larger of the first threshold value TH1 and the second threshold value TH2. However, TH may simply be at least larger than TH1.

Moreover, the radar apparatus may include a plurality of reception antennas and perform quadrature detection using the demodulator 109 to generate two types of baseband signals, I and Q, to derive a phase difference of the detection radio waves received between the reception antennas to estimate the direction of the object.

Moreover, the timing of turning on the speed incomplete flag 215 by the process of determining whether there is an incomplete signal in the Doppler frequency distribution (S201) in Embodiment 2 is not limited thereto, and may be turned on either after the discrimination process (S103) or before the position and speed estimation processes (S202 and S106), and may be turned on at the same time as at least one of the threshold setting process (S104) and the unwanted signal removal process (S105). The estimation unit 214 may then determine whether the speed incomplete flag 215 is turned on or not directly before the position and speed estimation processes (S202 and S106). If the speed incomplete flag 215 is turned on, the estimation unit 214 may omit the incomplete signal and estimate the position and speed of the object (S202), and if the speed incomplete flag 215 is turned off, the estimation unit 214 may estimate the position and speed according to Embodiment 1 (S105).

Moreover, for example, a portion or all of the components of each of the preceding devices may be configured from one system LSI (Large Scale Integration) integrated circuit. These may be integrated into individual chips, or a portion or all of the components may be integrated into one chip.

This kind of integration is referred to as LSI, but, depending on the number of components per chip, may also be referred to as IC, system LSI, super LSI, or ultra LSI.

Moreover, the method of circuit integration is not limited to LSI. Integration may be realized with a specialized circuit or a general purpose processor. A Field Programmable Gate Array (FPGA) or a reconfigurable processor that allows reconfiguration of the connection or configuration of the inner circuit cells of the LSI circuit can be used for the same purpose.

Furthermore, when advancement in semiconductor technology and derivatives of other technologies brings forth a circuit integration technology which replaces LSI, it will be appreciated that such a circuit integration technology may be used to integrate the functional blocks. Application of biotechnology is also a possibility.

INDUSTRIAL APPLICABILITY

The spread spectrum radar apparatus according to one or more exemplary embodiments disclosed herein is applicable to radar apparatuses integrated into various types of devices for hazard avoidance, such as automobiles, watercrafts, airplanes, and robots, as well as to radar apparatuses in security systems for detecting suspicious individuals.

The invention claimed is:

1. A spread spectrum radar apparatus that detects an object by use of a detection radio wave that is spectrum-spread, the spread spectrum radar apparatus comprising:
    a transmission circuit that generates a spread spectrum signal and radiates the spread spectrum signal as the detection radio wave, the spread spectrum signal being spectrum-spread by combining an oscillating signal and a first pseudo noise code;
    a reception circuit that receives the detection radio wave reflected back from the object as a reception signal, extracts, based on (i) a second pseudo noise code obtained by time-delaying the first pseudo noise code and (ii) the oscillating signal, a signal of a specific frequency band from a despread output of the reception signal, and generates baseband signals by separating the extracted signal by distance, each of the distances corresponding to an amount of time delay between the first pseudo noise code and the second pseudo noise code;
    a Doppler filter that, for each of the distances, discriminates a time series of the baseband signals based on Doppler frequencies to output output signals, each of which indicates a strength and is associated with one of the distances and one of the Doppler frequencies, the Doppler frequencies each being a difference between a frequency of the detection radio wave radiated from the transmission circuit and a frequency of the detection radio wave received by the reception circuit;
    a removal unit that includes a plurality of threshold processing units provided corresponding to the Doppler frequencies resulting from the discrimination and is configured to remove an unwanted signal from the output signals output by the Doppler filter; and
    an estimation unit configured to estimate a position and a speed of the object from the output signals removed of the unwanted signal,
    wherein each of the threshold processing units is configured to calculate a threshold value for a corresponding one of the Doppler frequencies using a peak value which is a maximum value of the output signals in a range of distance corresponding to a detection area for the object, and determine the output signals in the range of distance that are no greater than the calculated threshold value to be the unwanted signal.

2. The spread spectrum radar apparatus according to claim 1,
    wherein the threshold value is a greater one of a first threshold value and a second threshold value, the first threshold value being determined from the peak value and the second threshold value being determined from a noise floor of the output signals output by the Doppler filter when the detection radio wave is not reflected back from the object.

3. The spread spectrum radar apparatus according to claim 2,
    wherein the first threshold value is a product of an out-of-range leakage signal strength and a first allowance factor that is no less than one, the out-of-range leakage signal strength being a quotient of a signal strength of the peak value and an out-of-range signal suppression ratio being determined by a self-correlation characteristic of the first pseudo noise code,
    the second threshold value is a product of a signal strength of the noise floor and a second allowance factor that is no less than one, and
    the second allowance factor is greater than the first allowance factor.

4. The spread spectrum radar apparatus according to claim 2,
    wherein the estimation unit is configured to estimate a distance from the object using distance data indicating a distribution of strength with respect to the distances in each of the Doppler frequencies, from among the output signals removed of the unwanted signal,
    estimate a speed of the object using Doppler frequency data indicating a distribution of strength with respect to the Doppler frequencies in each of the distances, from among the output signals removed of the unwanted signal and in a given range of distance from the estimated distance, and
    track the object using a time series of the estimated distances and speeds.

5. The spread spectrum radar apparatus according to claim 4,
wherein the removal unit further includes a speed incomplete flag provided for each of the distances for indicating that the Doppler frequency data in a corresponding one of the distances is incomplete among the output signals, and
when a signal lower in strength than the first threshold value and higher in strength than the second threshold value is present among the output signals, turns on the speed incomplete flag corresponding to the distance to which the signal belongs.

6. The spread spectrum radar apparatus according to claim 5,
wherein when at least one of the speed incomplete flags corresponding to the given range of distance is turned on, the estimation unit is configured to omit the Doppler frequency data for the distances to which the speed incomplete flags correspond and estimate the distance of the object.

7. The spread spectrum radar apparatus according to claim 6,
wherein, for the distances flagged with the speed incomplete flag, the estimation unit is configured to estimate the speed of the object from a time series of the estimated distance of the object.

8. A method of controlling a spread spectrum radar apparatus that detects an object by use of a detection radio wave that is spectrum-spread, the method comprising:
generating a spread spectrum signal and radiating the spread spectrum signal as the detection radio wave, the spread spectrum signal being spectrum-spread by combining an oscillating signal and a first pseudo noise code;
receiving the detection radio wave reflected back from the object as a reception signal, extracting, based on (i) a second pseudo noise code obtained by time-delaying the first pseudo noise code and (ii) the oscillating signal, a signal of a specific frequency band from a despread output of the reception signal, and generating baseband signals by separating the extracted signal by distance, each of the distances corresponding to an amount of time delay between the first pseudo noise code and the second pseudo noise code;
discriminating, for each of the distances, a time series of the baseband signals based on Doppler frequencies to output output signals, each of which indicate a strength and is associated with one of the distances and one of the Doppler frequencies, the Doppler frequencies each being a difference between a frequency of the detection radio wave radiated from the transmission circuit and a frequency of the detection radio wave received by the reception circuit;
removing an unwanted signal from the output signals output in the discriminating; and
estimating a position and a speed of the object from the output signals removed of the unwanted signal,
wherein the removing includes:
calculating a threshold value for a corresponding one of the Doppler frequencies using a peak value which is a maximum value of the output signals in a range of distance corresponding to a detection area for the object, the threshold value being for removing the unwanted signal, and
removing signals in each of the Doppler frequencies that are no greater than the calculated threshold value.

* * * * *